(12) United States Patent
Aritake et al.

(10) Patent No.: US 6,478,429 B1
(45) Date of Patent: Nov. 12, 2002

(54) REFLECTIVE PROJECTOR

(75) Inventors: Hirokazu Aritake; Tsuyoshi Matsumoto; Shin Eguchi; Fumio Yamagishi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/289,143

(22) Filed: Apr. 8, 1999

(30) Foreign Application Priority Data

Oct. 29, 1998 (JP) ............................................ 10-309071
Feb. 26, 1999 (JP) ............................................ 11-051666

(51) Int. Cl.⁷ .............................................. G03B 21/14
(52) U.S. Cl. ................... 353/31; 353/20; 349/8
(58) Field of Search ............................. 353/31, 33, 34, 353/37, 69, 70, 97; 349/5, 8, 9

(56) References Cited

U.S. PATENT DOCUMENTS

| 4,969,730 | A | * | 11/1990 | Van Den Brandt | 353/31 |
| 5,648,860 | A | * | 7/1997 | Ooi et al. | 349/10 |
| 5,839,808 | A | * | 11/1998 | Koyama et al. | 353/97 |
| 5,865,521 | A | * | 2/1999 | Hashizume et al. | 353/38 |
| 6,076,931 | A | * | 6/2000 | Bone et al. | 353/100 |
| 6,176,583 | B1 | * | 1/2001 | Sawai | 353/20 |
| 6,179,424 | B1 | * | 1/2001 | Sawamura | 353/33 |

FOREIGN PATENT DOCUMENTS

| JP | 4-223456 | 8/1992 |
| JP | 5-66414 | 3/1993 |
| JP | 5-257115 | 10/1993 |
| JP | 6-148589 | 5/1994 |
| JP | 10-003125 | 1/1998 |
| KR | 93-23763 | 12/1993 |

\* cited by examiner

Primary Examiner—William Dowling
(74) Attorney, Agent, or Firm—Greer, Burns & Crain, Ltd.

(57) ABSTRACT

A reflective projector includes a light source, reflective liquid crystal panels, a dichroic prism for separating a light beam from the light source into light beams of predetermined colors by using interference and for synthesizing the light beams of predetermined colors into a light beam, and a projection lens. The reflective projector further includes a first polarizer provided between the light source and the reflective liquid crystal panels and a second polarizer provided between the reflective liquid crystal panels and the projection lens.

33 Claims, 37 Drawing Sheets

POWER ON

POWER OFF 56-4 REFLECTIVE DISPLAY ELEMENT 56-4

POWER ON 56-4

POWER OFF

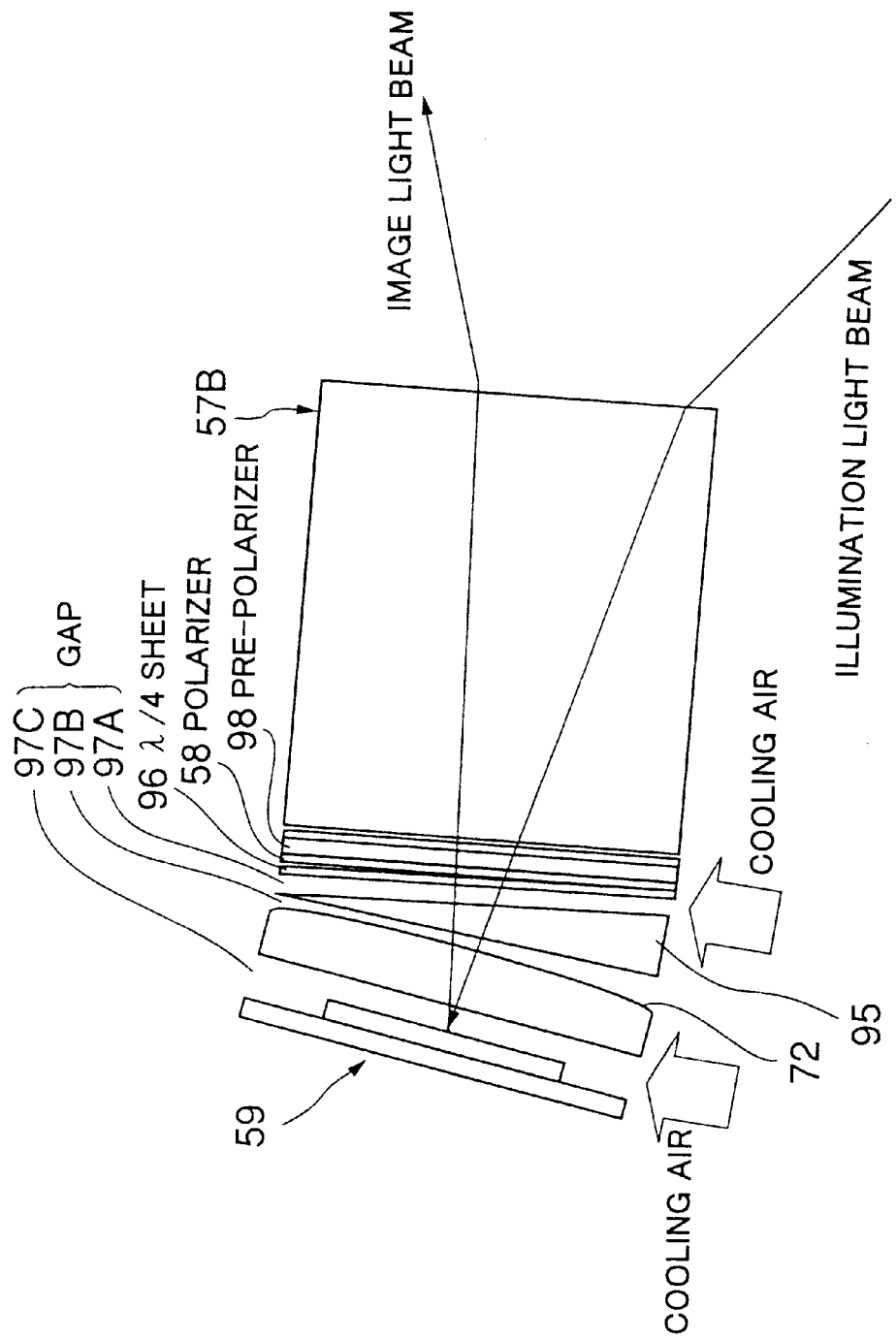

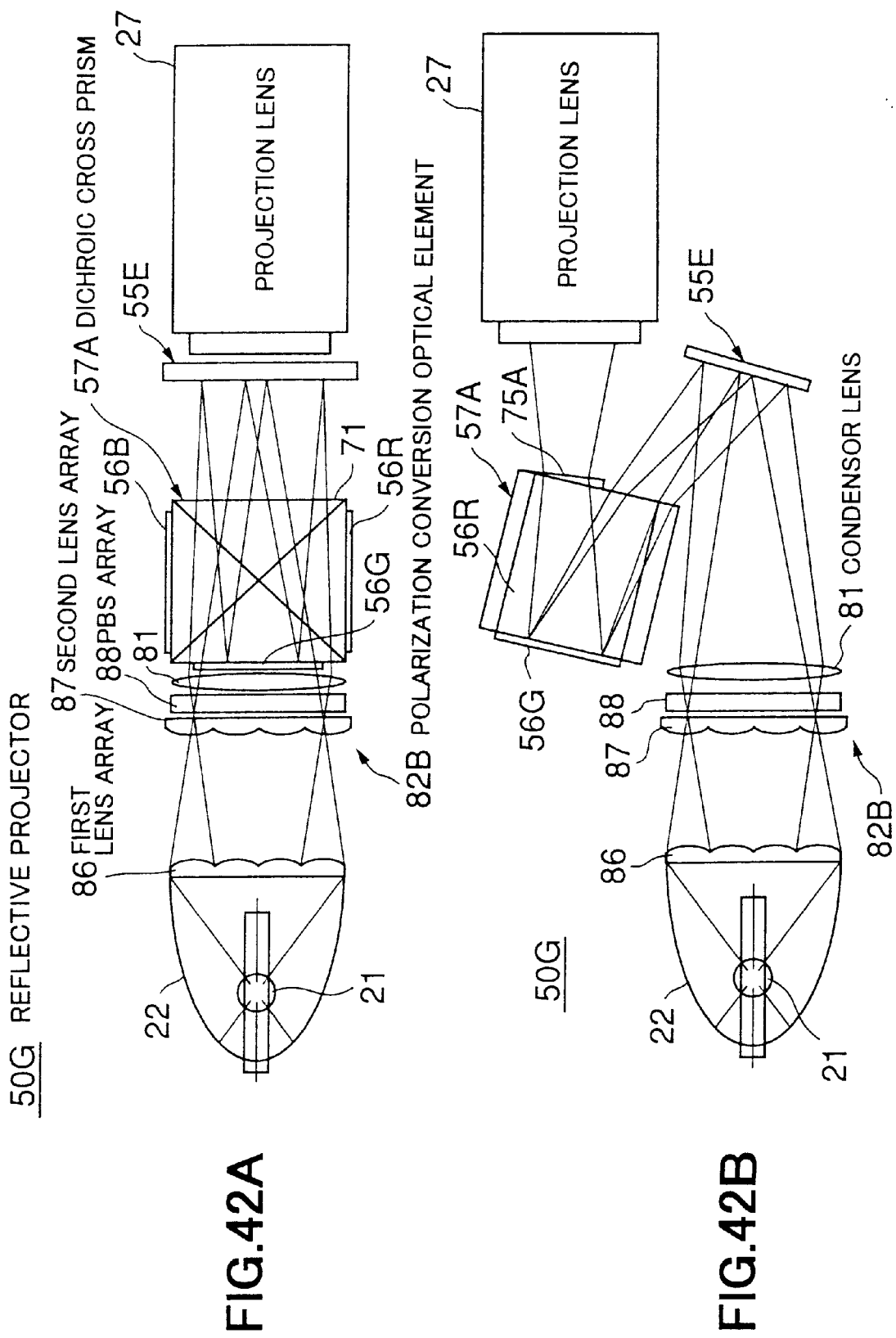

REFLECTIVE PROJECTOR

BACKGROUND OF THE INVENTION

1. Field of the Invention

The present invention relates to a reflective projector. More particularly, the present invention relates to a reflective projector which can display an image on a large screen by using a color separation/synthesis part, a reflective liquid crystal panel and the like.

Conventionally, as a projective liquid crystal projector for displaying an image on a large screen, a translucent-type liquid crystal panel having a TN liquid crystal panel is widely used.

In recent years, research on a reflective liquid crystal panel in which the aperture rate of a pixel is increased by providing a reflector electrode in each pixel is being conducted. In addition, the reflective liquid crystal panel is applied to the projective-type liquid crystal projector. The aperture rate of the reflective liquid crystal panel is higher than that of the conventional translucent-type liquid crystal panel. Therefore, a small and efficient projector can be realized.

2. Description of the Related Art

FIG. 1 is a block diagram showing an example of a conventional reflective projector.

As shown in the figure, the reflective projector 10 includes a light source 11, a polarization separation prism (PBS) 12, a dichroic prism 14, reflective liquid crystal panels 16R, 16G, and 16B, a projection lens 17, and so on. Here, R, G, and B indicate red, green and blue respectively.

In the configuration, the polarization separation prism 12 extracts linearly polarized light from the light flux which is emitted from the light source 11. At the same time, the direction of the linearly polarized light is changed by 90°. Then, the linearly polarized light enters the dichroic prism 14.

The incident light beam to the dichroic prism 14 is separated into light beams of red, green, and blue (RGB), and the light beams exit from the dichroic prism 14. After being reflected by respective reflective liquid crystal panels 16R, 16G, and 16B corresponding to each color, the light beams enter the polarization separation prism 12 again through the same optical path.

At this time, among the light beams which are modulated in respective reflective liquid crystal panels 16R, 16G, and 16B, light beams which are modulated in areas of activated liquid crystal exit after the direction of the polarization of the light beam is turned by 90°. Therefore, exiting light beams modulated in the area pass through the polarization separation prism 12, and are projected on a screen (not shown in FIG. 1) from the projection lens 17 so as to form an image.

Since the polarization separation prism 12 which is an expensive optical device is used for the above-mentioned conventional reflective projector 10, there is a problem that the cost of the reflective projector 10 will increase. Further, there is also a problem that it is difficult for the polarization separation prism 12 to separate polarization of the light beam from the light source 11 which spreads for example by ±2°.

Further, the conventional reflective projector 10 makes RGB light beams by separating white light from the light source 11 into three light beams. For this reason, there is a problem that color purity falls since the components of cyan (Cy) and yellow (Ye) which exist between G-B and between G-R respectively are mixed among the three light beams and an illumination for emitting a convergence light flux can not be used.

One measure against this problem is to provide a cyan (Cy) cut-off filter and a yellow (Ye) cut-off filter between the light source 11 and the dichroic prism 14 or between the dichroic prism 14 and the projection lens 17 (refer to FIG. 1) so as to cut unnecessary wavelengths.

However, the cut rates of the cyan cut-off filter and the yellow cut-off filter which are band-pass filters are not enough for cutting a 10–20 nm band which is the unnecessary wavelength region. Here, the cut rate is a reflection/absorption rate of any wavelength region. Therefore, light loss may occur by cutting a required wavelength region, or, since the unnecessary wavelengths are not fully cut, sufficient color purity cannot be assured. Therefore, assuring color purity without the loss of light has not been realized.

Further, since two optical elements which are the dichroic prism 14 and the polarization separation prism 12 are provided between the reflective liquid crystal panels 16R, 16G, and 16B and the projection lens 17 in the conventional reflective projector 10, there is a problem that the spacing between the reflective liquid crystal panels 16R, 16G, and 16B and the projection lens 17 becomes long. The result is that the size of the projector becomes large.

Furthermore, since the optical path of the dichroic prism 14 is long, spreading of light occurs. Therefore, the polarization separation prism 12, the dichroic prism 14, and the projection lens 17 need to be made large-sized in order to cope with the spreading of light.

SUMMARY OF THE INVENTION

It is an object of the present invention to provide a reflective projector which is small, efficient, inexpensive, and has high color purity.

The above object of the present invention is achieved by a reflective projector including:
- a light source;
- a reflective liquid crystal panel;
- a color separation/synthesis unit for separating a light beam from the light source into light beams of predetermined colors and/or for synthesizing the light beams of predetermined colors into a light beam;
- a projection lens;
- a first polarizer provided between the light source and the reflective liquid crystal panel; and
- a second polarizer provided between the reflective liquid crystal panel and the projection lens.

According to the above-mentioned invention, a good contrast image can be obtained at low cost since an expensive polarization beam splitter which is conventionally used becomes unnecessary.

BRIEF DESCRIPTION OF THE DRAWINGS

Other objects, features and advantages of the present invention will become more apparent from the following detailed description when read in conjunction with the accompanying drawings, in which:

FIG. 24B is a diagram showing the third embodiment of the reflective display element when power is turned on;

FIG. 40 is a block diagram of the dichroic cross prism of the reflective liquid crystal projector according to a modification of the thirteenth embodiment of the present invention;

FIG. 42A is a schematic plan view of the reflective liquid crystal projector according to a modification of the ninth embodiment of the present invention;

FIG. 42B is a schematic side elevational view of the reflective liquid crystal projector according to a modification of the ninth embodiment of the present invention.

DETAILED DESCRIPTION OF THE PREFERRED EMBODIMENTS

In the following, embodiments of the present invention will be described with reference to the figures.

Figure 2:
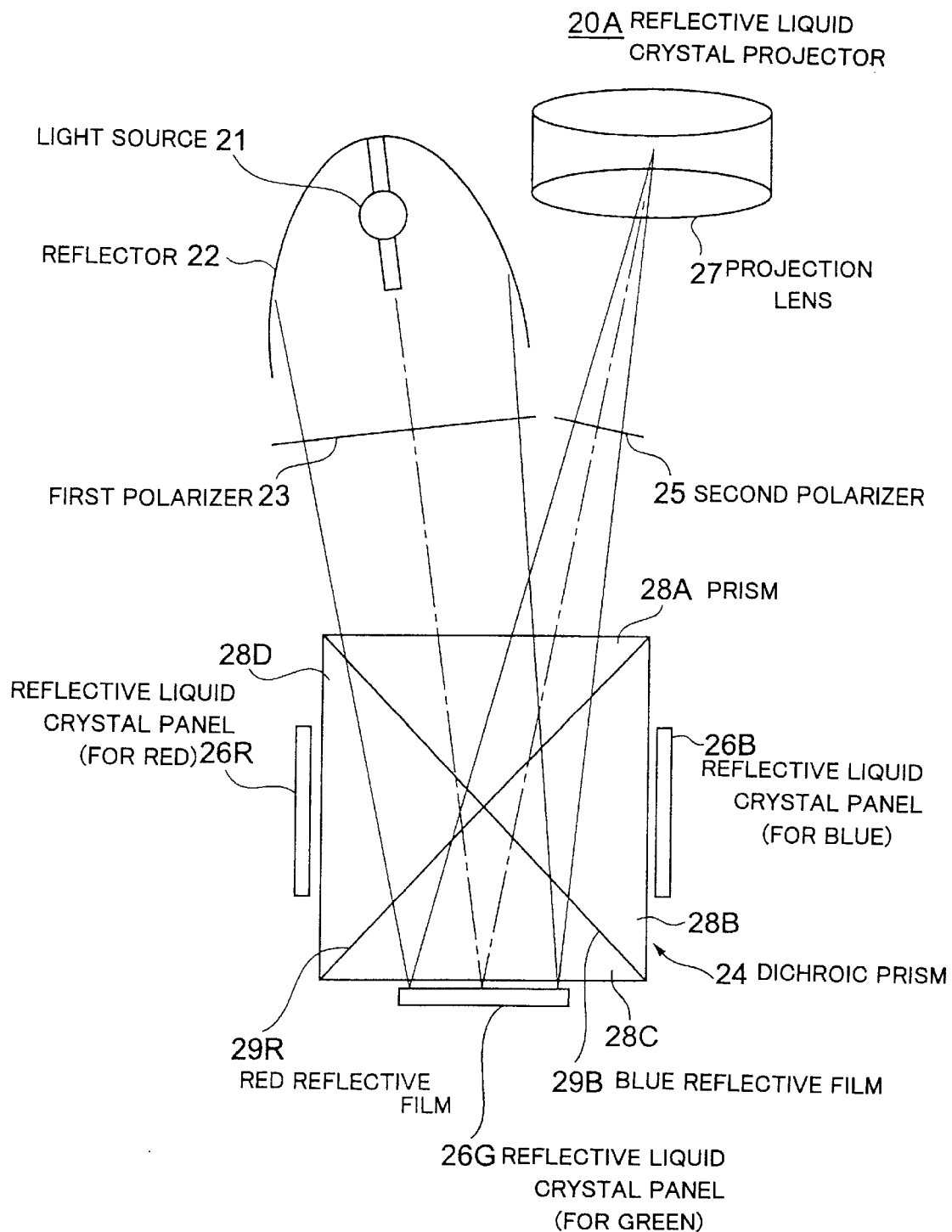
FIG. 2 is a block diagram of a reflective liquid crystal projector according to a first embodiment of the present invention.

FIG. 2 is a block diagram showing principal parts of a reflective projector 20A which is a first embodiment of the present invention. As shown in the figure, the reflective projector 20A of the embodiment includes a light source 21, a first polarizer 23, a dichroic prism 24, a reflector 22, a second polarizer 25, reflective liquid crystal panels 26R, 26G, and 26B (R indicates red, G indicates green and B indicates blue), a projection lens 27, and so on. Since the reflective projector 20A uses the reflective liquid crystal panels 26R, 26G, and 26B as reflective display elements, the reflective projector will be called a reflective liquid crystal projector hereinafter.

The light source 21, the reflector 22, and the first polarizer 23 form an illumination system. The light source 21 is a short arc lamp of a high-pressure mercury type and emits white light. The reflector 22 is provided in the back of the light source 21, and is designed so that a reflected light beam may gather toward the projection lens 27. Specifically, the reflector 22 is shaped elliptical and the light source 21 is located at the first focus of this ellipse reflector 22.

The dichroic prism 24 separates white light which comes from the light source 21 into three colors of red (R), green (G), and blue (B). Moreover, as will be described later, the dichroic prism 24 functions as a color separation/synthesis part which synthesizes light beams of each color reflected by the reflective liquid-crystal panels 26R, 26G, and 26B. The dichroic prism 24 takes a form in which four prisms 28A–28D each of which prism has the shape of a triangle pole are combined. The dichroic prism 24 is called a dichroic cross prism. A red reflective film 29R and a blue reflective film 29B which are interference films for separating and synthesizing colors are formed on the surfaces on which the prisms 28A–28D face each other.

The dichroic prism 24 of the above-mentioned configuration is located between the light source 21, and each of the reflective liquid crystal panels 26R, 26G, and 26B, and between each of the reflective liquid-crystal panels 26R, 26G, and 26B and the projection lens 27.

In the embodiment, the reflective liquid crystal panels 26R, 26G, and 26B are used as reflective display elements. The reflective liquid crystal panels 26R, 26G, and 26B are homeotropic aligned type liquid crystal panels (TFT-type liquid crystal panels). The liquid crystal in the panel is liquid crystal of Merck Co. whose dielectric constant anisotropy is negative. Each of the reflection electrodes which are provided in each of the reflective liquid crystal panels 26R, 26G, and 26B uses an aluminum electrode as a display electrode of a TFT-type liquid crystal panel, and the electrode of the facing substrate is a transparent electrode.

The product ($\Delta n \cdot d$) of a thickness d of the liquid crystal layer and a birefringence $\Delta n$ of the liquid crystal can be configured, for example, to be between 0.1 micron and 0.6 micron. The angle of the direction to which a liquid crystal molecule inclines by application of a voltage is established as 45° with respect to the direction of the length of the liquid crystal panel in the plane of drawing in FIG. 2. Furthermore, the incident angle of a light beam which enters each of the reflective liquid crystal panels 26R, 26G, and 26B is about 10° for example. However, a projector which is not influenced by tilting can be realized by an incident angle less than 20°.

The projection lens 27 projects a light beam on a screen, the light beam having been image-modulated at each of the reflective liquid crystal panels 26R, 26G, and 26B and synthesized by the dichroic prism 24. In this embodiment, a lens for enlargement is used as the projection lens 27.

A polarization film including iodine is used for the first and second polarizer 23 and 25. The first polarizer 23 is provided between the light source 21 and each of the reflective liquid crystal panels 26R, 26G, and 26B. The second polarizer 25 is provided between each of the reflective liquid crystal panels 26R, 26G, and 26B and the projection lens 27. Furthermore, the first polarizer 23 and the second polarizer 25 are formed so as to be in the relation of crossed nicols mutually.

Here, the characteristics of the dichroic prism 24 and the first polarizer 23 will be described. In this embodiment, when the light beam from the light source 21 enters the dichroic prism 24 after being polarized by the first polarizer 23, the direction of the polarized light is perpendicular or parallel to a straight line which is drawn in the pillar direction (perpendicular to the plane of drawing in FIG. 2) of the prism 28A comprising the dichroic prism.

Further, in this embodiment, the characteristics of the dichroic prism 24 on the side of the light source is different from that on the side of projection. That is, the light beam enters each of the reflective films 29R and 29B of the dichroic prism 24 at a shallow angle, whereas the light beam is emitted to the projection side at a deeper angle. To conform to the configuration, the reflective/transmittance characteristics are adjusted at the left side and the right side. Specifically, the characteristics are adjusted so that the right side of the dichroic prism 24 is more transparent than the left side.

In the following, the operation of the reflective liquid crystal projector 20A of the above-mentioned configuration will be described.

Figure 10A:
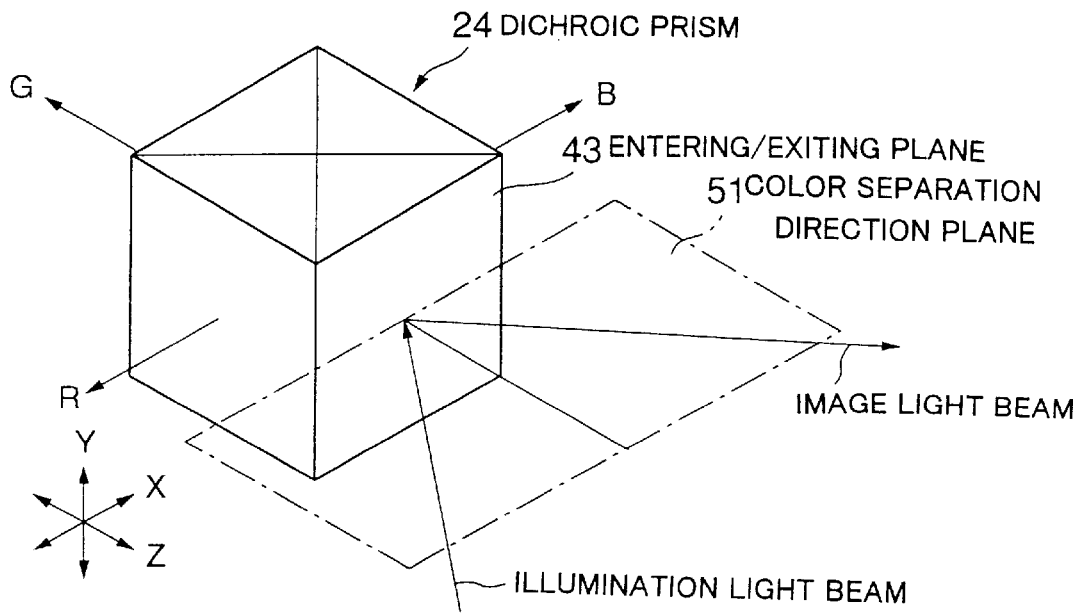
FIG. 10A is a diagram for explaining entering/exiting directions along a color separation direction plane of an illumination light beam and an image light beam with respect to a dichroic prism.

The illumination light beam (white light) emitted from the light source 21 is converted into S polarized light or P polarized light by passing through the first polarizer 23. This illumination light beam impinges on an entering/exiting plane 43 of the dichroic prism 24. The direction to which the axis of the incident light beam inclines is determined so that the incident light beam (the illumination light beam) is orthogonal to a straight line drawn in the pillar direction of the prisms 28A–28D. That is, as shown in FIG. 10A, the incident light beam enters at predetermined angle along a plane (this plane is called a color separation direction plane 51) which spreads in the color separation direction of the dichroic prism 24. Moreover, at the time of this incidence, the polarization status of the incident light is non-changing.

As for the illumination light beam which enters into the dichroic prism 24, colors are separated in the dichroic prism 24. Specifically, only a red light beam is reflected from the red reflective film 29R, and only a blue light beam is reflected from the blue reflective film 29B. Thus, only the red light beam enters into the reflective liquid crystal panel 26R, and only the green light beam enters into the reflective liquid crystal panel 26G, and only the blue light beam enters into the reflective liquid crystal panel 26B.

Each of the light beams of the different colors enters into the respective one of the reflective liquid crystal panels 26R, 26G, and 26B in the slanting direction, and then is reflected there from.

Here, in the state that the liquid crystal molecules are homeotropic aligned due to a voltage not being applied to the reflective liquid crystal panels 26R, 26G, and 26B, the polarization state of the incident light does not change, and the incident light beam is reflected as it is from each of the reflective liquid crystal panels 26R, 26G, and 26B.

In this case, after passing through the dichroic prism 24 again, the reflected light beam is absorbed in the second polarizer 25 which is in the relation of crossed nicols with the first polarizer 23 and provided in front of the projection lens 27. Therefore, the reflected light is not projected. That is, a black image will be represented.

On the other hand, in the state that the liquid crystal molecules fall horizontally due to a voltage being applied to the liquid crystal reflective panels 26R, 26G, and 26B, the polarization state of the incident light changes. The light beam is reflected from each of the reflective liquid crystal panels 26R, 26G, and 26B, and the reflected light beam passes through the dichroic prism 24 again. After color synthesis, the reflected light beam exits from the entering/exiting plane 43, and passes through the second polarizer 25 provided in front of the projection lens 27, and, then, is projected to a screen. That is, an image is displayed. The light beam in which colors are synthesized is called an image light beam. At this time, as shown in FIG. 10A, the image light beam is emitted from the entering/exiting plane 43 to the projection lens 27 at a predetermined angle along the color separation direction plane 51. Thus, in this embodiment, the entering/exiting plane 43 which is one of planes of the dichroic prism 24 functions as an entering plane for the illumination light beam and an exiting plane for the image light beam.

Obviously, the principal axis of the incident light beam entering into each of the reflective liquid crystal panels 26R, 26G, and 26B must be in the state of an S wave or a P wave with respect to the reflective planes of each of the reflective panels 26R, 26G, and 26B. When the light beam enters in a state other than the S wave or the P wave, the reflective characteristics of the dichroic prism 24 differ from the reflective characteristics in the above-mentioned state. Therefore, in this case, the polarization of the light beam which is reflected from the reflective liquid crystal panels 26R, 26G, and 26B and passed through the dichroic prism 24 twice is not linear polarization. Therefore, the above-mentioned black image can not be generated.

Further, it is indispensable that the alignment of the liquid crystal molecules of each of the reflective liquid crystal panels 26R, 26G, and 26B is almost a complete homeotropic alignment. When a light beam in the state of the S wave (P wave) enters into the reflective liquid crystal panels 26R, 26G, and 26B which have the homeotropic aligned liquid crystals, the polarization status of the light beam does not change. That is, since the S wave of the incident light beam is perpendicular to the plane formed by the direction of the incident light beam and the optic axis of the liquid crystal, and the P wave is parallel to the plane, the light beam is absorbed by the second polarizer because the light beam impinges on the second polarizer as it is without disturbance of the polarization status. Therefore, a good black image can be realized. The optic axis is a delay phase axis or an alignment direction, and, in this case, is perpendicular to the substrate since the light beam is vertically aligned.

Therefore, according to the present embodiment, a high contrast image can be formed without using an expensive polarization light splitter used conventionally. Thereby, miniaturization and lower cost of the reflective liquid crystal projector 20A will be realized while maintaining a high-contrast image.

In the following, a second embodiment of the present invention will be described.

Figure 3:
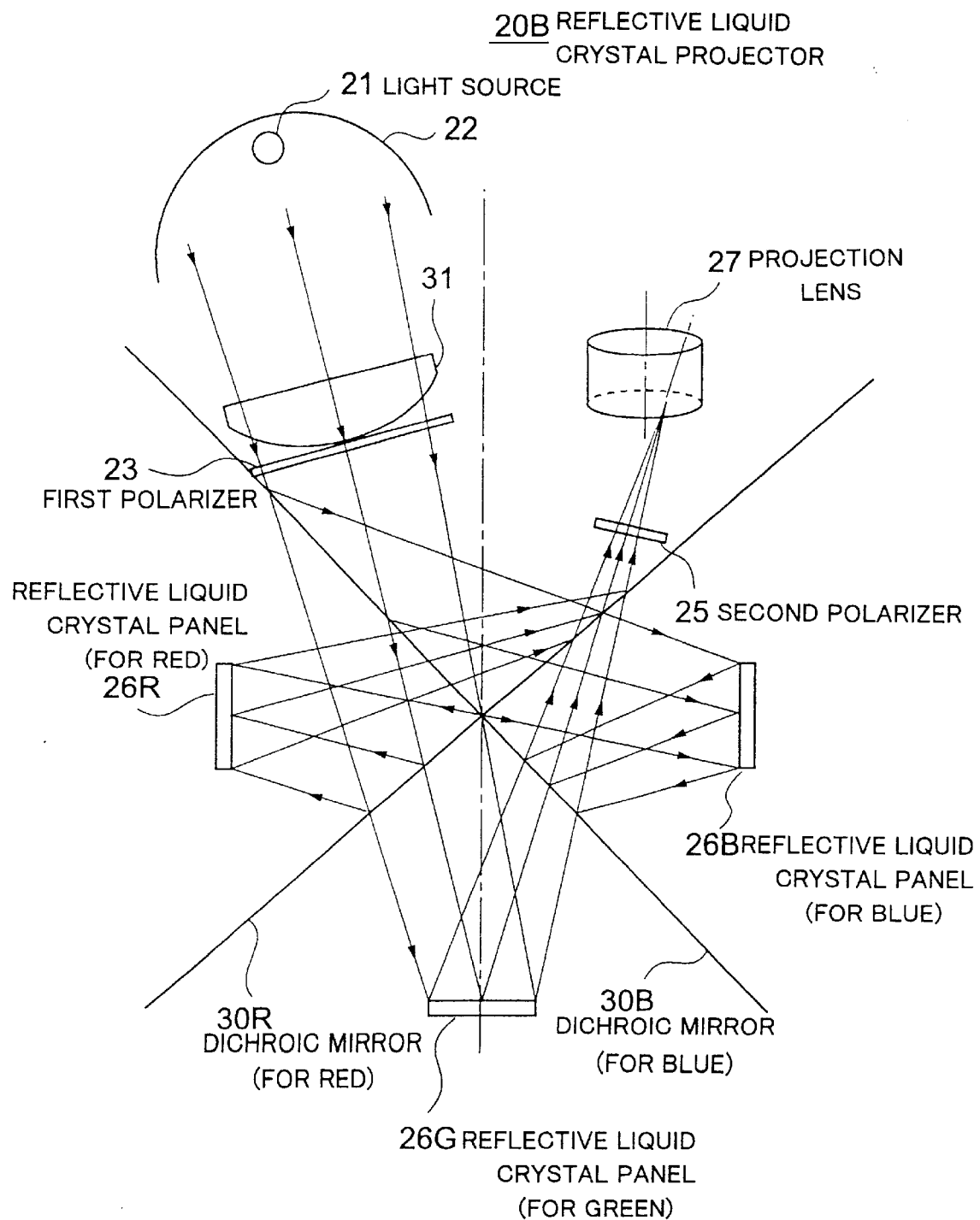
FIG. 3 is a block diagram of the reflective liquid crystal projector according to a second embodiment of the present invention.

FIG. 3 shows a reflective liquid crystal projector 20B which is the second embodiment of the present invention. In FIG. 3, the same reference numbers are attached to parts in FIG. 3 corresponding to the parts shown in FIG. 2, and the explanation of the parts will be omitted, as will be the case for descriptions of each embodiments.

In the description of the reflective liquid crystal projector 20A of the first embodiment, an example having the dichroic prism 24 as a color separation/synthesis part was shown. The reflective liquid crystal projector 20B of this embodiment includes dichroic mirrors 30R and 30B instead of the dichroic prism 24.

The dichroic mirror 30R is configured such that a pair of mirrors on which interference films for reflecting red light are formed are joined so as to be a flat plane. And, the dichroic mirror 30B is configured such that a pair of mirrors on which interference films for reflecting blue light are formed are joined so as to be a flat plane. The dichroic mirror 30R and the dichroic mirror 30B are provided so that they are orthogonal. That is, the combination of the dichroic mirrors 30R and 30B is in the form of an X character.

In addition, as for the reflection characteristics of these dichroic mirrors 30R and 30B, the characteristics on the light source side are different from the characteristics on the projection side, as was the case for the dichroic prism 24 described in the first embodiment.

In this configuration, the dichroic mirrors 30R and 30B have a function equivalent to that of the dichroic prism 24 in the first embodiment. However, in this configuration in which the dichroic mirrors 30R and 30B are combined so as to be shaped like an X character, the center (inter-section part of the X) of the combination may become a shadow for projection.

Thus, in this embodiment, the optical path is configured so that a light beam from the light source 21 enters into the dichroic mirrors 30R and 30B in a slanting direction in order to avoid the center of the combination. The entry angle is configured, for example, to be about 20°–30° According to this configuration, a shadow will not be projected in an image, and degradation of the image can be inhibited.

However, in the configuration in which an incident light beam enters into the dichroic mirrors 30R and 30B in a slanting direction, as mentioned above, since the light beam also enters into the projection lens 27 in a slanting direction, a strong tilting influence will arise. Thus, in this embodiment, the optical axis of the projection lens 27 is shifted to the optical axis of the reflected light beam reflected from the dichroic mirrors 30R and 30B so that a reverse tilting influence may be applied for preventing an image from being projected to a position extremely separated from the projector.

Therefore, in this embodiment, miniaturization and lower cost of the reflective liquid crystal projector 20A can be attained like the first embodiment while realizing a high quality projection image.

Figure 4:
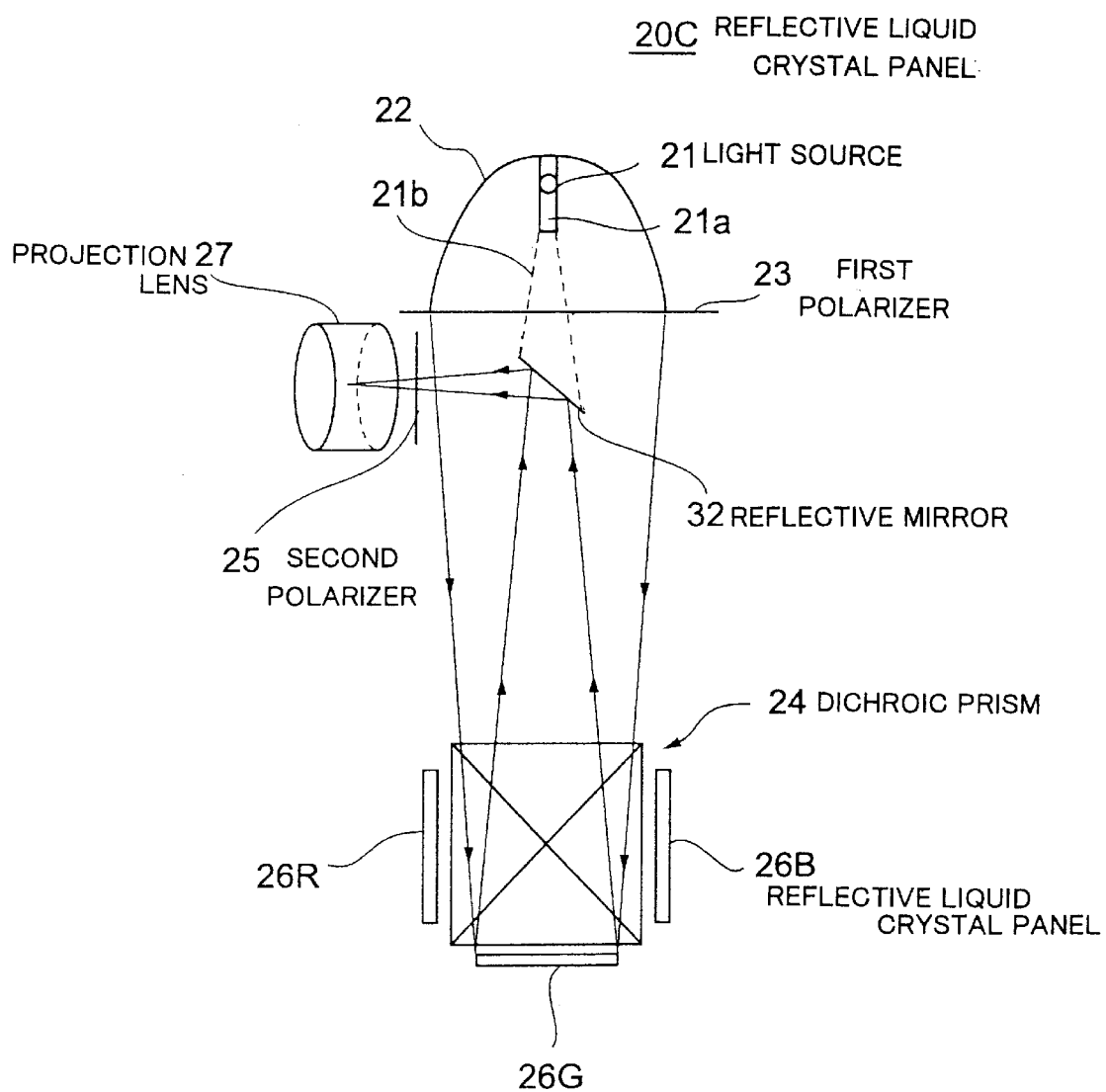
FIG. 4 is a block diagram of the reflective liquid crystal projector according to a third embodiment of the present invention.

In the following, a third embodiment of the present invention will be described. FIG. 4 shows a reflective liquid crystal projector 20C of the third embodiment of the present invention.

In the first embodiment mentioned above, the light beam from the light source 21 enters into each of the reflective liquid crystal panels 26R, 26G, and 26B in a slanting direction. On the other hand, in the reflective liquid crystal projector 20C of this embodiment, the light beam from the light source 21 enters into each of the reflective liquid crystal panels 26R, 26G, and 26B perpendicularly. That is, the optical axis of the light beam from the light source 21 is perpendicular to each reflective liquid crystal panels 26R, 26G, and 26B. The reflected light beam from each of the reflective liquid crystal panels 26R, 26G, and 26B is reflected by a small reflective mirror 32 which is provided in front of the light source 21, and impinges on the projection lens 27.

The reflective mirror 32 is located in a shadow part 21*b*, which is shown with a dashed line in FIG. 4, of a supporting part 21*a* for supporting a light emitting part of the light source 21. Since the supporting part 21*a* is provided on the side of the dichroic prism 24 with respect to the light source 21, the light beam from the light source 21 is interrupted by the supporting part 21*a*, and the shadow 21*b* is formed. Therefore, even if the reflective mirror 32 is provided in the part 21*b*, a quantity of light emitted from the light source 21 does not decrease.

According to the configuration of this embodiment, the reflective liquid crystal projector 20C having a high contrast can be realized like the first embodiment. Moreover, the light source 21 can be arranged near the projection lens 27 by providing the above-mentioned reflective mirror 32. Therefore, miniaturization of the reflective liquid crystal projector 20C can be realized.

Next, a fourth embodiment of the present invention will be described.

Figure 5:
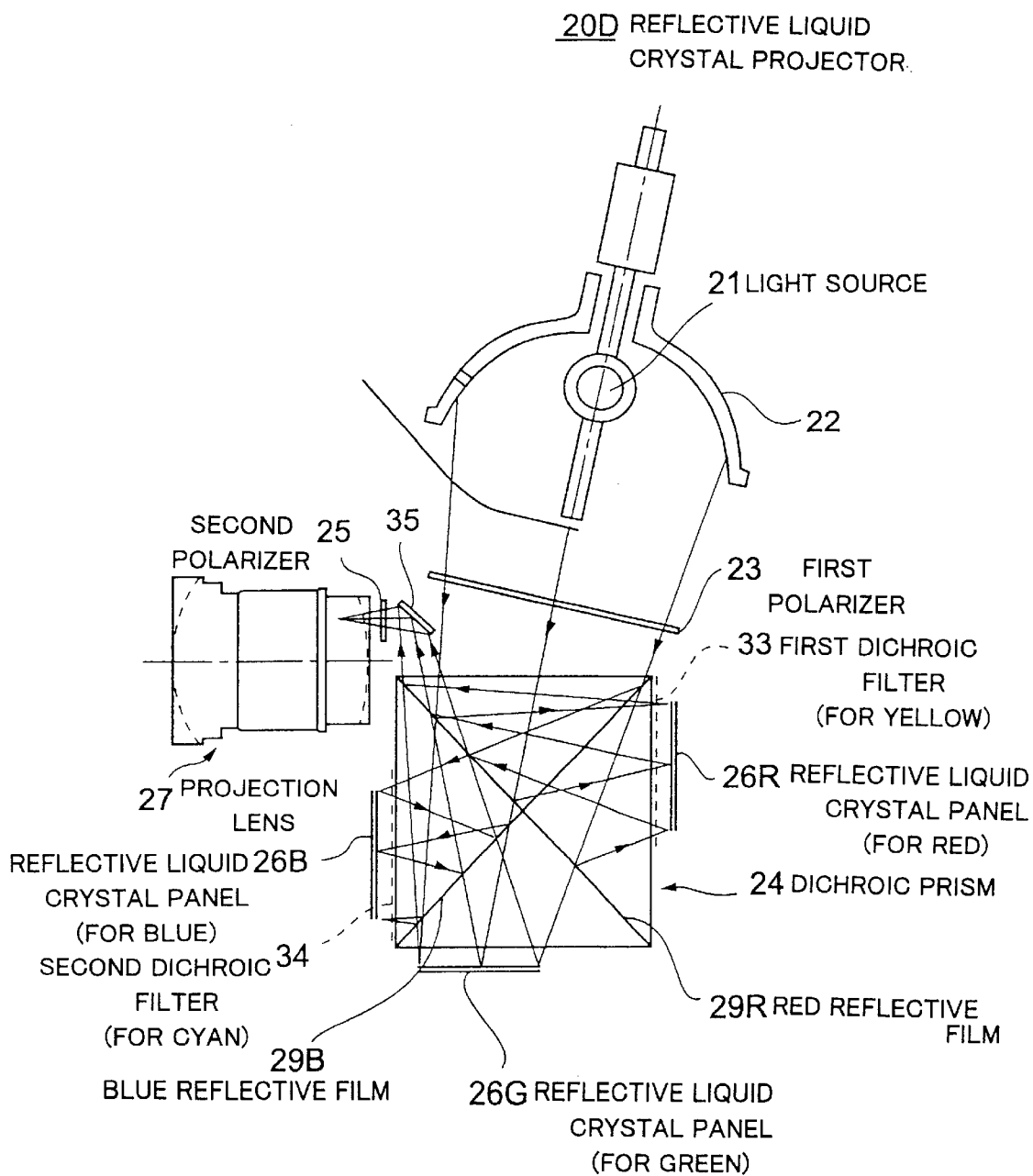
FIG. 5 is a block diagram of the reflective liquid crystal projector according to a fourth embodiment of the present invention.

FIG. 5 shows a reflective liquid crystal projector 20D which is the fourth embodiment of the present invention. In the reflective liquid crystal projector 20D of the embodiment, a first dichroic filter 33 is provided between a red reflective film 29R formed in the dichroic prism 24 and a reflective liquid crystal panel 26R for red color, and a second dichroic filter 34 is provided between a blue reflective film 29B formed in the dichroic prism 24 and a reflective liquid crystal panel 26B for blue color. In this embodiment, each of the dichroic filters 33 and 34 are formed in established positions of the dichroic prism 24.

In the reflective liquid crystal projector 20D of this embodiment, the light beam emitted from the light source 21 impinges on the entering/exiting plane 43 of the dichroic prism 24 after being polarized by the first polarizes 23. In the dichroic prism 24, only red light (R) is reflected by the red reflective film 29R, and only blue light (B) is reflected by the blue reflective film 29B, and green light (G) passes through each of the reflective films 29R and 29B. Thus, the white light emitted from the light source 21 is separated into RGB lights.

In other words, the blue reflective film 29B functions as a high-pass filter, and the red reflective film 29R functions as a low-pass filter. Specifically, the cut wavelength of the red reflective film 29R is set to 585 nm, the cut wavelength being defined as the wavelength at which the reflection factor of light having the wavelength is 50%. The red reflective film 29R reflects light of 585 nm or more. The cut wavelength of the blue reflective film 29B is set to 540 nm so as to reflect light of 540 nm or less. This cut wavelength is necessary for obtaining high purity of a green component. That is, the light beam from the light source 21 becomes a green light beam with a high purity by passing through the dichroic prism 24.

As a different configuration, a band-pass filter that reflects green light (G) may be provided in the dichroic prism. However, in such a configuration, since a suitable cut rate cannot be established compared with the configuration using a high-pass filter and a low-pass filter, suitable characteristics cannot be obtained.

Image information is superimposed on the green light beam which passes through the dichroic prism 24 by the liquid crystal panel 26G, and the green light beam enters into the dichroic prism 24 again. As described before, the reflective liquid crystal panel 26G can realize normal black. That is, when a light beam enters into the panel, the direction of polarization is not changed in a pixel to which a voltage is not applied. Then, the entered light beam is reflected with the same polarization direction, and the reflected light beam is absorbed by the second polarizer 25. In a pixel to which a voltage is applied, since the direction of polarization of the entering light beam is turned by 90°, the reflected light beam passes through the second polarizer 25 and is projected on to a screen (not shown in FIG. 5) by the projection lens 27.

Strictly speaking, the red light beam reflected by the dichroic prism 24 contains a yellow (Ye) component which exists in the boundary between red (R) and green (G), in addition to the red component, because of the cut wavelength of the dichroic prism 24 configured in order to obtain the color purity of green, as mentioned above. It is a problem that the color purity of red can not be obtained.

Thus, in this embodiment, a first dichroic filter 33 is provided between the red light emitting surface of the dichroic prism 24 and the reflective liquid crystal panel 26R. In the embodiment, the first dichroic filter 33 is formed so that only a yellow component of 595 nm or less may be reflected. Therefore, the yellow components of 595 nm or less is reflected by the first dichroic filter 33. On the other hand, components of 595 nm or more pass through the first dichroic filter 33 and are reflected by the reflective liquid crystal panel 26R.

The component reflected by the first dichroic filter 33 is the above-mentioned yellow (Ye) component. Since the yellow (Ye) component reflected by the first dichroic filter 33 is not reflected by the reflective liquid crystal panel 26R, the direction of polarization does not change. On the other hand, the direction of polarization of the light reflected by the reflective liquid crystal panel 26R changes.

Both of the light reflected by the first dichroic filter 33 and the light reflected by the reflective liquid crystal panel 26R enter into the dichroic prism 24 again. After that, they enter into the second polarizer 25 through the reflective mirror 35 from the entering/exiting plane 43. As mentioned above, since the direction of polarization of the yellow (Ye) light which is reflected by the first dichroic filter 33 has not changed, the yellow (Ye) light is absorbed in the second polarizer 25. On the other hand, as for the light reflected by the reflective liquid crystal panel 26R, the direction of polarization has changed. Therefore, the light passes through the second polarizer 25 and is projected on a screen with the projection lens 27. Therefore, since the unnecessary yellow (Ye) component is not contained in the light projected on the screen, an image of a high color purity can be realized.

Strictly speaking, the blue light reflected by the dichroic prism 24 contains the cyan (Cy) component which exists in the boundary of blue (B) and green (G) in addition to the blue component. Therefore, there is a problem that blue color purity can not been obtained.

Then, in the embodiment, a second dichroic filter 34 is provided between the blue light exiting surface of the dichroic prism 24 and the reflective liquid crystal panel 26B. In this embodiment, the second dichroic filter 34 reflects only a cyan component of 510 nm or more. Therefore, a cyan component of 510 nm or more is reflected by the second dichroic filter 34. On the other hand, a component of 510 nm or less wavelength passes through the second dichroic filter 34, and it is reflected by the liquid crystal panel 26B.

The component reflected by the second dichroic filter 34 is the above mentioned cyan (Cy) component. Since the light of the cyan (Cy) component reflected by the second dichroic filter 34 is not reflected by the reflective liquid crystal panel 26B, the direction of polarization of the light does not change. On the other hand, the direction of polarization of the light reflected by the reflective liquid crystal panel 26B changes.

Both of the light reflected by the second dichroic filter 34 and the light reflected by the reflective liquid crystal panel 26B enter into the dichroic prism 24 again. After that, they enter into the second polarizer 25 by the reflective mirror 35 from the entering/exiting plane 43.

As mentioned above, since the direction of polarization of the cyan (Cy) light which is reflected by the second dichroic filter 34 has not changed, the cyan (Cy) light is absorbed in the second polarizer 25. On the other hand, as for the light reflected by the reflective liquid crystal panel 26B, the direction of polarization has changed. Therefore, the light passes through the second polarizer 25 and is projected on a screen with the projection lens 27. Since the unnecessary cyan (cy) component is not contained in the light projected on the screen, an image of a high color purity can be realized.

Thus, according to the reflective liquid crystal projector 20D of this embodiment, color purity and efficiency will improve only by adding the first and second dichroic filters 33, 34 to the configuration of the first embodiment without any other modification.

The cut wavelengths for the first and second dichroic filters 33, 34 need to be finely tuned according to each cut wavelength characteristics of the reflective films 29R and 29B provided in the dichroic prism 24. However, in the specification of the reflective films 29R and 29B usually used, the cut wavelengths of the first dichroic filter 33 may be configured at 565–600 nm, and the cut wavelengths of the second dichroic filter 34 may be configured at 490–530 nm Further, instead of the dichroic prism 24 used in the above-mentioned embodiment, it is possible to use the cross dichroic mirror which is the same as one used in the second embodiment in which a pair of dichroic mirrors are combined like a X character.

However, the filters 33, 34 on the dichroic prism 24 cannot be formed in this case because flat surfaces for forming the filters 33, 34 do not exist in the cross dichroic mirror. Therefore, in order to realize the same effect as the fourth embodiment, the dichroic filters 33 and 34 are directly formed on the reflective liquid crystal panels 26R and 26B, or they are separately located between each of the reflective liquid crystal panels 26R, 26B and the dichroic mirror.

In the following, a fifth embodiment of the present embodiment will be described.

Figure 6:
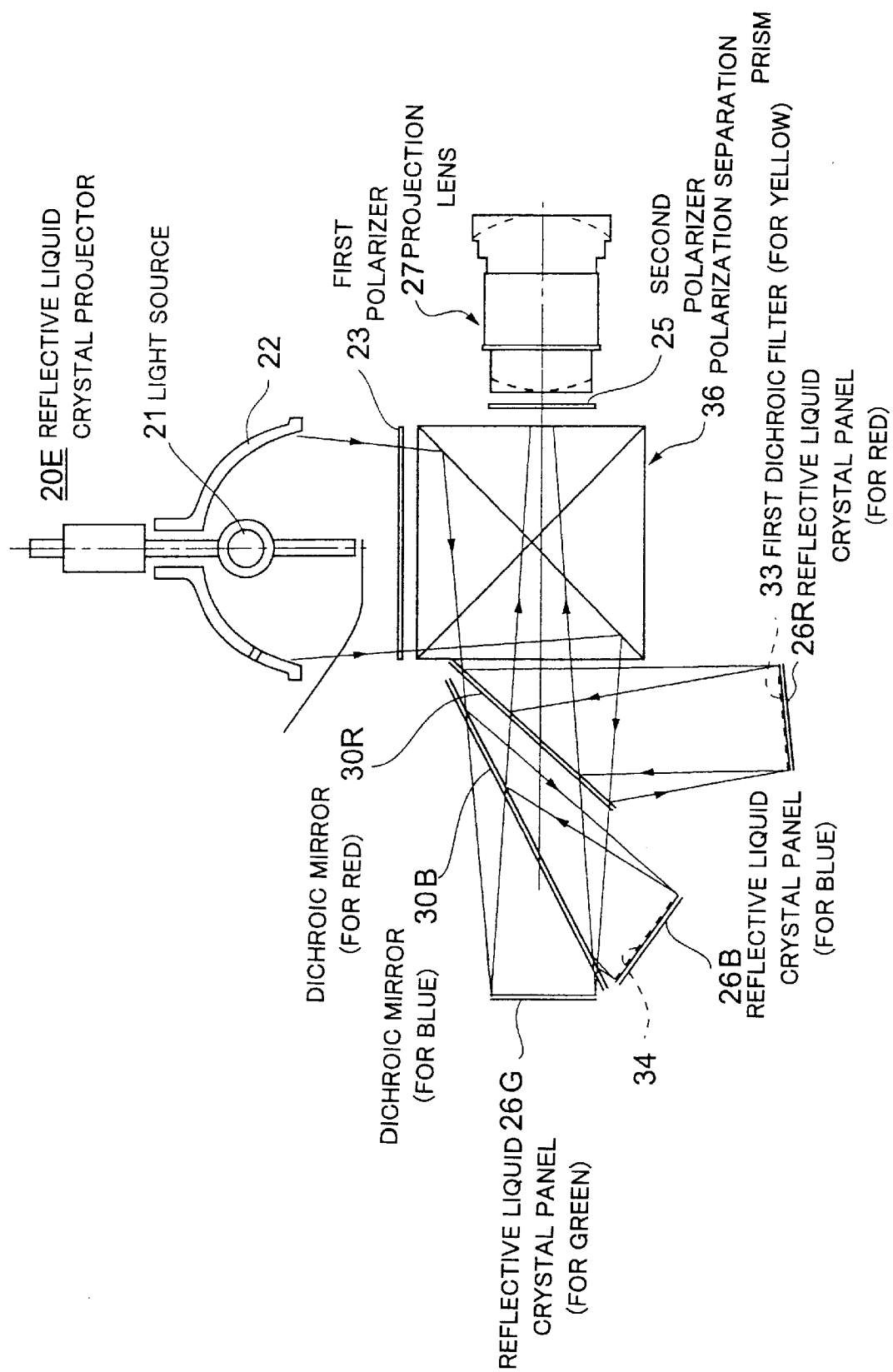
FIG. 6 is a block diagram of the reflective liquid crystal projector according to a fifth embodiment of the present invention.

FIG. 6 shows a reflective liquid crystal projector 20E of the fifth embodiment of the present invention. In the above mentioned fourth embodiment, a configuration including the dichroic prism 24 was shown. In the fifth embodiment, a polarization separation prism 36 and a dichroic mirrors 30R and 30B are used instead of the dichroic prism 24

In the reflective liquid crystal projector 20E shown in FIG. 6, linearly polarized light is extracted by the first polarizer 23 and the polarization separation prism 36 from the light beam emitting from the light source 21. Simultaneously, the direction of the light beam is changed by 90° and, the linearly polarized light beam enters into the dichroic mirrors 30R and 30B. The dichroic mirror 30R for reflecting red light functions as a low-pass filter as in the case of the fourth embodiment, and the dichroic mirror 30B for reflecting blue light functions as a high-pass filter.

According to this configuration, better characteristics can be obtained compared with the configuration having a band pass filter which reflects green light.

As in the case of the fourth embodiment, the cut wavelengths of each of dichroic mirrors 30R and 30B are configured to be 585 nm and 540 nm respectively so that the color purity of green light can be maintained.

On the other hand, the red light and the blue light contains unnecessary components which are yellow (Ye) and cyan (Cy) in the same way as the fourth embodiment. For this reason, the first dichroic filter 33 is provided on the reflective liquid crystal panel 26R, and the second dichroic filter 34 is provided on the reflective liquid crystal panel 26B.

Thereby, the same effect as the fourth embodiment can be realized. That is, the yellow (Ye) component reflected by the first dichroic filter 33 and the cyan (Cy) component reflected by the second dichroic filter 34 are absorbed by the second polarizer 25 since the polarization directions of both of the components are not changed. Therefore, the incident light to the projection lens 27 has adequately high color purity. Moreover, since a band pass filter without steep cut characteristics is not used, above-mentioned color purity can be obtained efficiently.

A sixth embodiment of the present invention will be described in the following.

Figure 7:
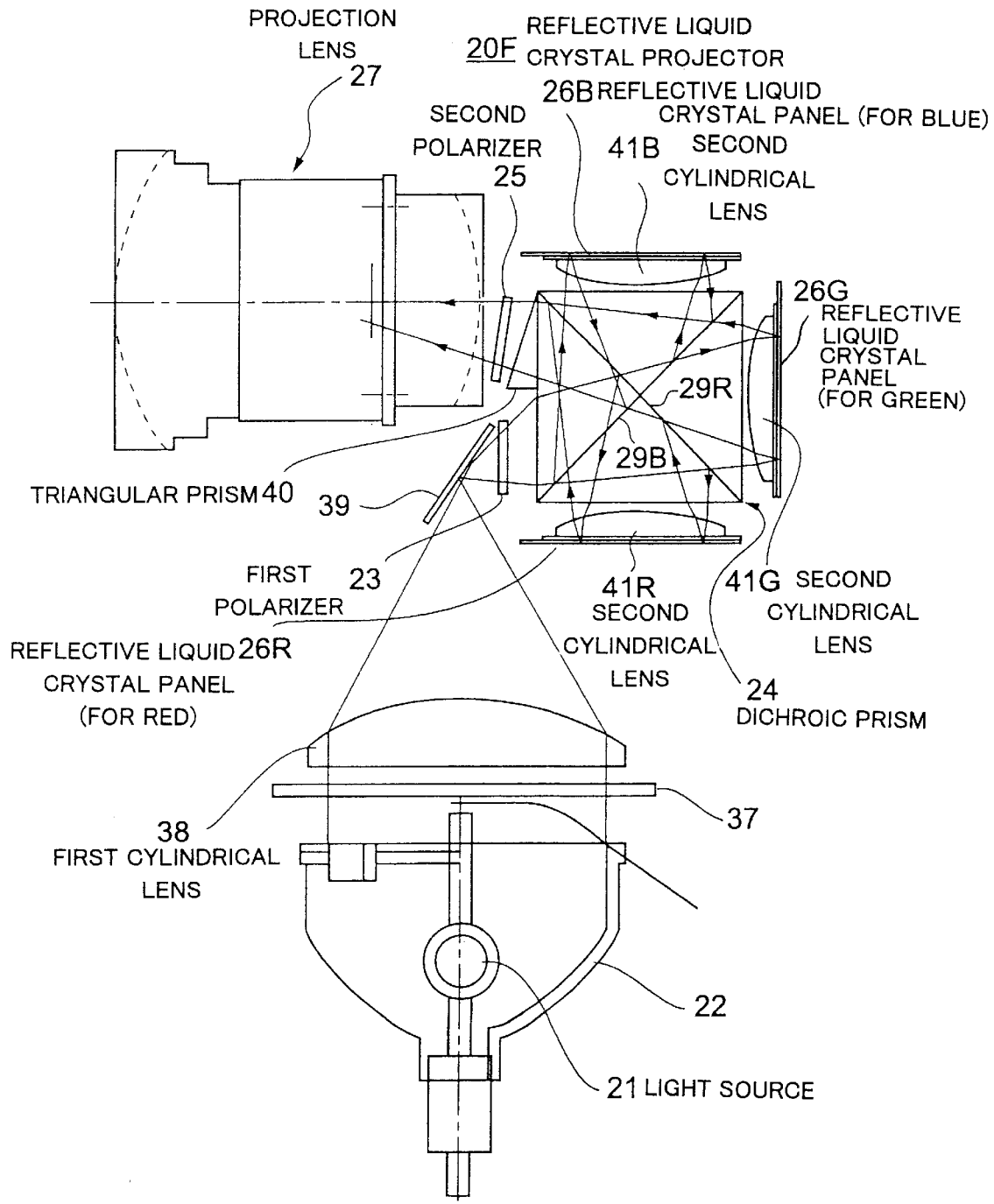
FIG. 7 is a block diagram of the reflective liquid crystal projector according to a sixth embodiment of the present invention.

FIG. 7 shows a reflective liquid crystal projector 20F of the sixth embodiment of the present invention. The reflective liquid crystal projector 20F of the present embodiment includes a light source 21, a UV/IR filter 37, a first cylindrical lens 38, a reflective mirror 39, a first polarizer 23, a dichroic prism 24, second cylindrical lenses 41R, 41G, and 41B, reflective liquid crystal panels 26R, 26G, and 26B, a triangular prism 40, a second polarizer 25, a projection lens 27, and so on.

In this liquid crystal projector 20F, the light beam emitted from the light source 21 which is converted into a parallel light beam by the reflector 22 enters into the first cylindrical lens 38 after ultraviolet/infrared components are removed by the UV/IR filter 37.

The first cylindrical lens 38 is configured such that it gathers light only in the color separation direction of the dichroic prism 24. The focal length of the first cylindrical lens 38 is established so that a light beam from the first cylindrical lens 38 may have a focus near the light entering surface of the dichroic prism 24.

The light beam emitted from the first cylindrical lens 38 enters into the entering/exiting plane 43 of the dichroic prism 24 in a slanting direction after the direction is changed by the reflective mirror 39. At the time, the location of the entering light is established to be offset in the color separation direction of the dichroic prism 14.

The dichroic prism 24 is a cube of 40 mm per side, for example. As mentioned before, the red reflective film 29R and the blue reflective film 29B is provided so that they may be orthogonal to each other and the angle with respect to the entering/exiting plane is 45° Therefore, green light (G) in the white light beam which entered into the dichroic prism 24 passes through the dichroic prism 24, and red light (R) and blue light(B) reflect to predetermined directions. Thereby, the light beam entered into the dichroic prism 24 is separated into color components of RGB, and the components impinges on the reflective liquid crystal panels 26R, 26G, and 26B respectively.

In this embodiment, the second cylindrical lenses 41R, 41G, and 41B are provided such that each of the lenses 41R, 41G, and 41B is physically integral (optically bonded) with each of the reflective liquid crystal panels 26R, 26G, and 26B respectively. Therefore, each of the RGB color light beams which is separated by the dichroic prism 24 exits from the dichroic prism 24, and enters into the reflective liquid crystal panels 26R, 26G, and 26B respectively through the second cylindrical lens 41R, 41G, and 41B.

As mentioned above, since each of the cylindrical lenses 41R, 41G, and 41B is optically bonded to the reflective liquid panels 26R, 26G, and 26B respectively, a ghost image or loss of light quantity due to interface reflection will not occur.

Moreover, since each of the reflective liquid crystal panels 26R, 26G, and 26B is located in parallel with the dichroic prism 24 as mentioned above, each of three color light beams enters into the reflective liquid crystal panels 26R, 26G, and 26B in a slanting direction.

Therefore, the light beam (image light beam) reflected by the reflective liquid crystal panels 26R, 26G, and 26B arrives at the entering/exiting plane 43 of the dichroic prism 24 through the same path as the entering path. However, the location of the exiting light beam at the entering/exiting plane 43 is offset in the direction opposite to that of the entering light. That is, the location of the entering light beam on the entering/exiting plane 43 and the location of the exiting light beam at the plane 43 are independent of each other.

Accordingly, the incident angles with respect to the reflective films 29R and 29B are about 56° and about 34° respectively in the dichroic prism 24. The incident light beam is S polarized light and the entry angle to the red reflective film 29R is set to be 56°, and the exiting angle of the reflected light beam is set to be 34°. On the other hand, as for the blue reflective film 29B, the entry angle is set to be 34° and the exiting angle is set to be 56°. Thus, when the entry angle to the red reflective film 29R is set to θ r (=56°) and the entry angle to the blue reflective film 29B is set to θ b (=34°), the relation of θ b<θ r is fulfilled.

Thereby, in the reflective films 29R and 29B, since the direction of DP cut wavelength shift in the dichroic prism 24 due to the difference of the angle between the entering light beam and the exiting light beam can be opposite to the direction of the cut wavelength shift due to the polarization direction, these wavelength shifts can be compensated.

This utilizes that the cut wavelengths of the light beams which enter into the reflective films (interference films) provided in the dichroic prism has a property shown below:

(1) In the case of a red reflective film:
(Cut wavelength of P polarization)>(Cut wavelength of S polarization)
In the case of a blue reflective film:
(Cut wave length of P polarization)<(Cut wave length of S polarization)
(2) In the case of a red reflective film:
(Cut wavelength of a larger entry angle)>(Cut wavelength of a smaller entry angle)
In the case of a blue reflective film:
(Cut wavelength of a larger entry angle)<(Cut wavelength of a smaller incident angle).

In this embodiment, since the optical axes of the dichroic prism 24 and each of the reflective liquid crystal panels 26R, 26G, and 26B leans to the direction of light beams as mentioned above, astigmatism may arise in a projected image. Therefore, a triangular prism 40 for image correction is provided between the dichroic prism 24 and the projection lens 27 in order to inhibit the astigmatism.

The triangular prism 40 is physically integrated (optically bonded) to the dichroic prism 24, and is configured such that the relation between the vertical angle θ a of the triangular prism and the angle θ b which the exiting light beam from the dichroic prism 24 forms with the normal to the exiting plane of the dichroic prism 24 is θ a≈θ b.

By providing the triangular prisms 40 between the dichroic prism 24 and the projection lens 27, aberration opposite to the aberration due to the dichroic prism 24 is applied to the light beam to the projection lens 27. Therefore, aberration can be corrected collectively. Thereby, a good projection image without aberration can be obtained.

Figure 1:
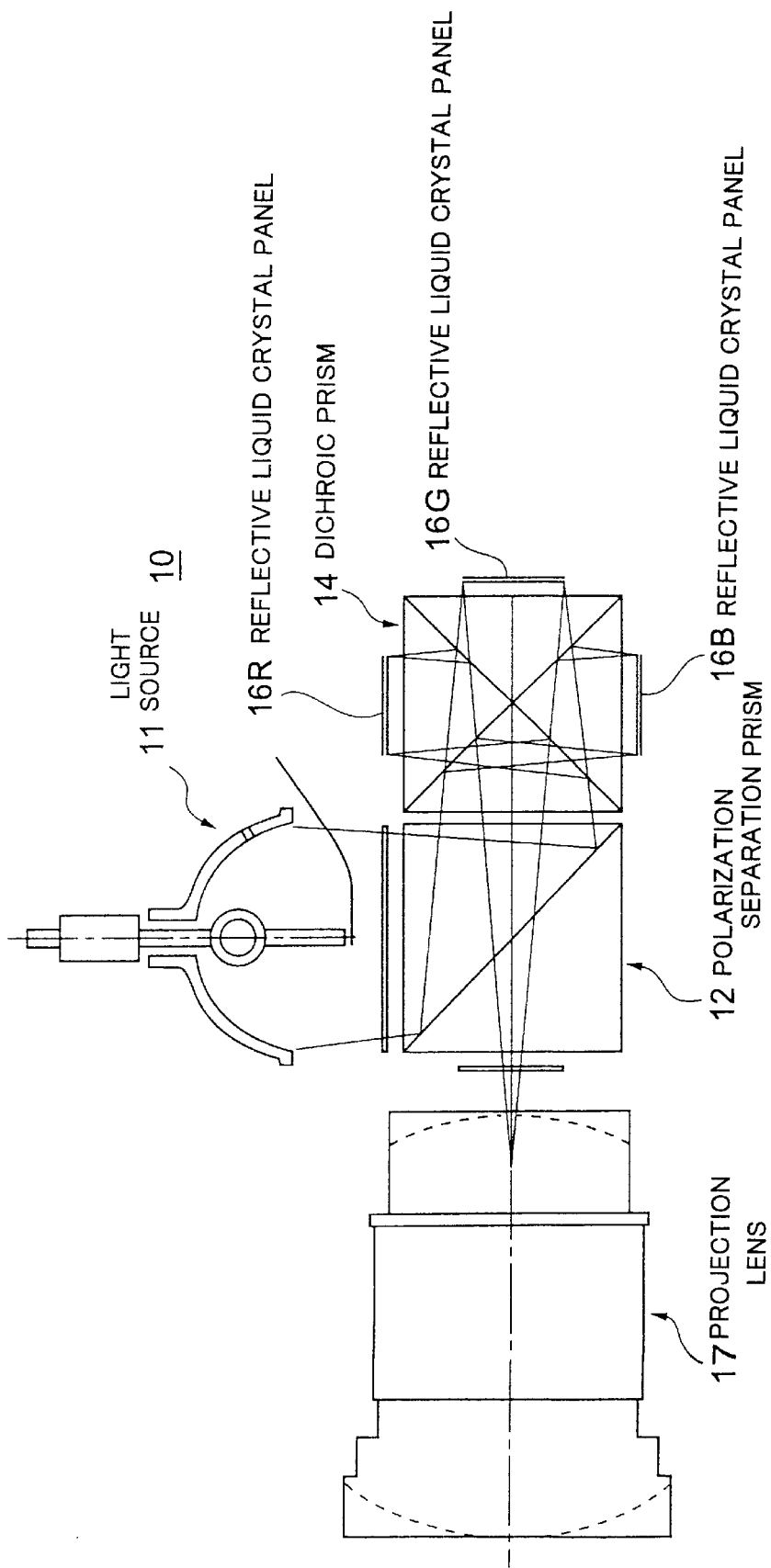
FIG. 1 is a block diagram of a conventional reflective liquid crystal projector.

As is evident from the above description, since the polarization separation prism 12 (refer to FIG. 1) conventionally used for color separation of an entering light beam becomes unnecessary in the reflective liquid crystal projector 20F of this embodiment, the spacing between the projection lens 27 and the reflective liquid crystal panels 26R, 26G, and 26B, which is called a back focus of the projection lens 27, can be short. Moreover, the present embodiment is configured such that the convergence direction of the first and second cylindrical lenses 38, 41R, 41G, and 41B agrees with the direction of the color separation by the dichroic prism 24. Thereby, light gathering without polarization disturbance can be realized.

If the convergence direction of the first and second cylindrical lenses 38, 41R, 41G, and 41B does not agree with the direction of the color separation by the dichroic prism 24, the relation between the light beams and each of the reflection plane 29R, 29B becomes P-S mixed relation rather than the P/S separated relation. Therefore, polarization disturbance may occur, and the degree of polarization of the linearly polarized light polarized by the first polarize 23 may decrease. This appears as a contrast degradation of a projected image. However, according to the configuration of the present embodiment, light gathering without polarization disturbance can be realized.

Thereby, since miniaturization of the dichroic prism 24 and the whole optical system can be attained, miniaturization of the reflective liquid crystal projector 20F can be realized.

Figure 8:
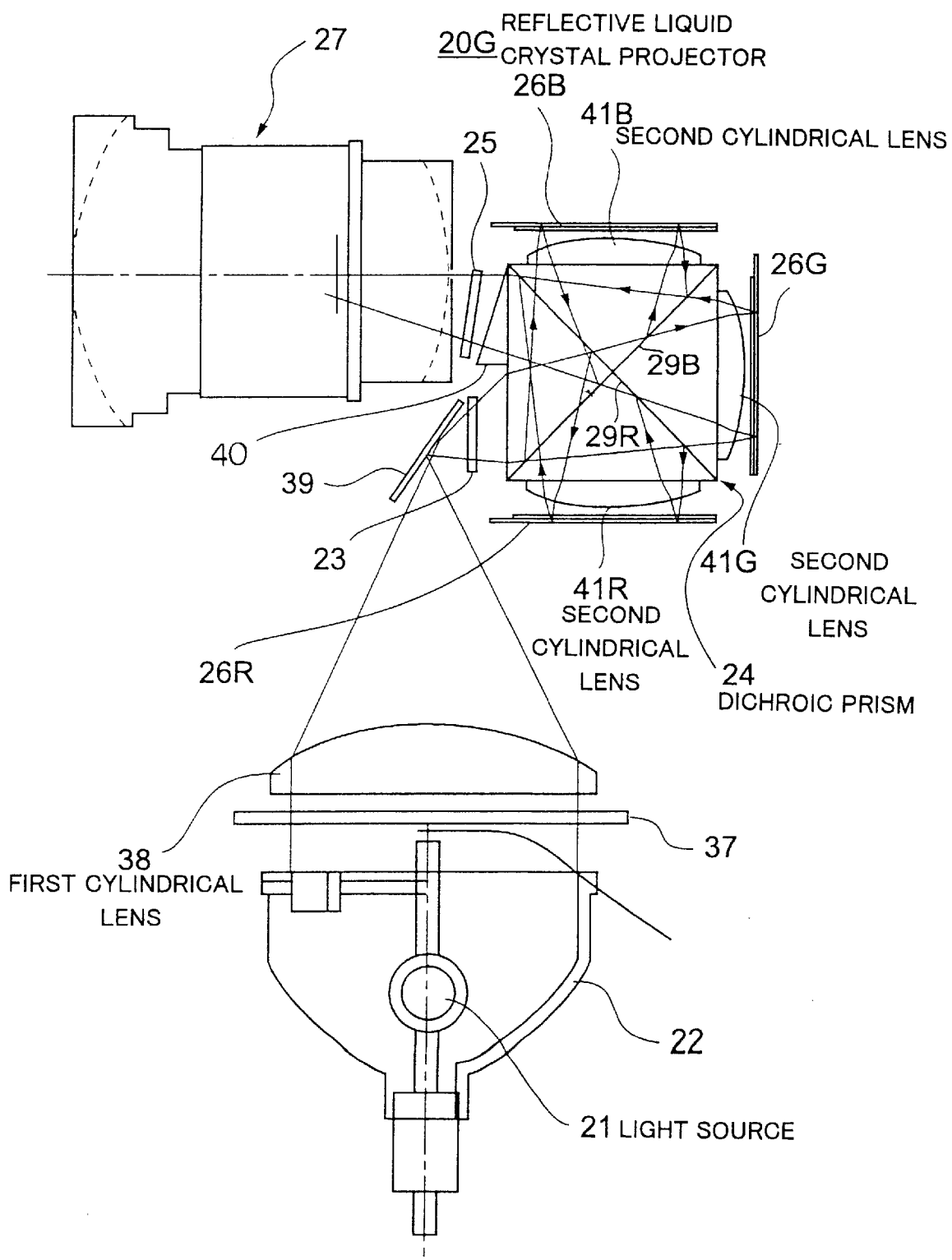
FIG. 8 is a block diagram of a first modification of the reflective liquid crystal projector according to the sixth embodiment of the present invention.

In the above mentioned embodiment, a planoconvex lens is used as each of the second cylindrical lenses 41R, 41G, and 41B, and the flat-surface side of each of the lenses is optically connected to the reflective liquid crystal panels 26R, 26G, and 26B respectively. However, the configuration of the second cylindrical lens is not limited to this. For example, as shown in FIG. 8, the flat surface side of the lens may be physically integrated to the dichroic prism 24.

Figure 9:
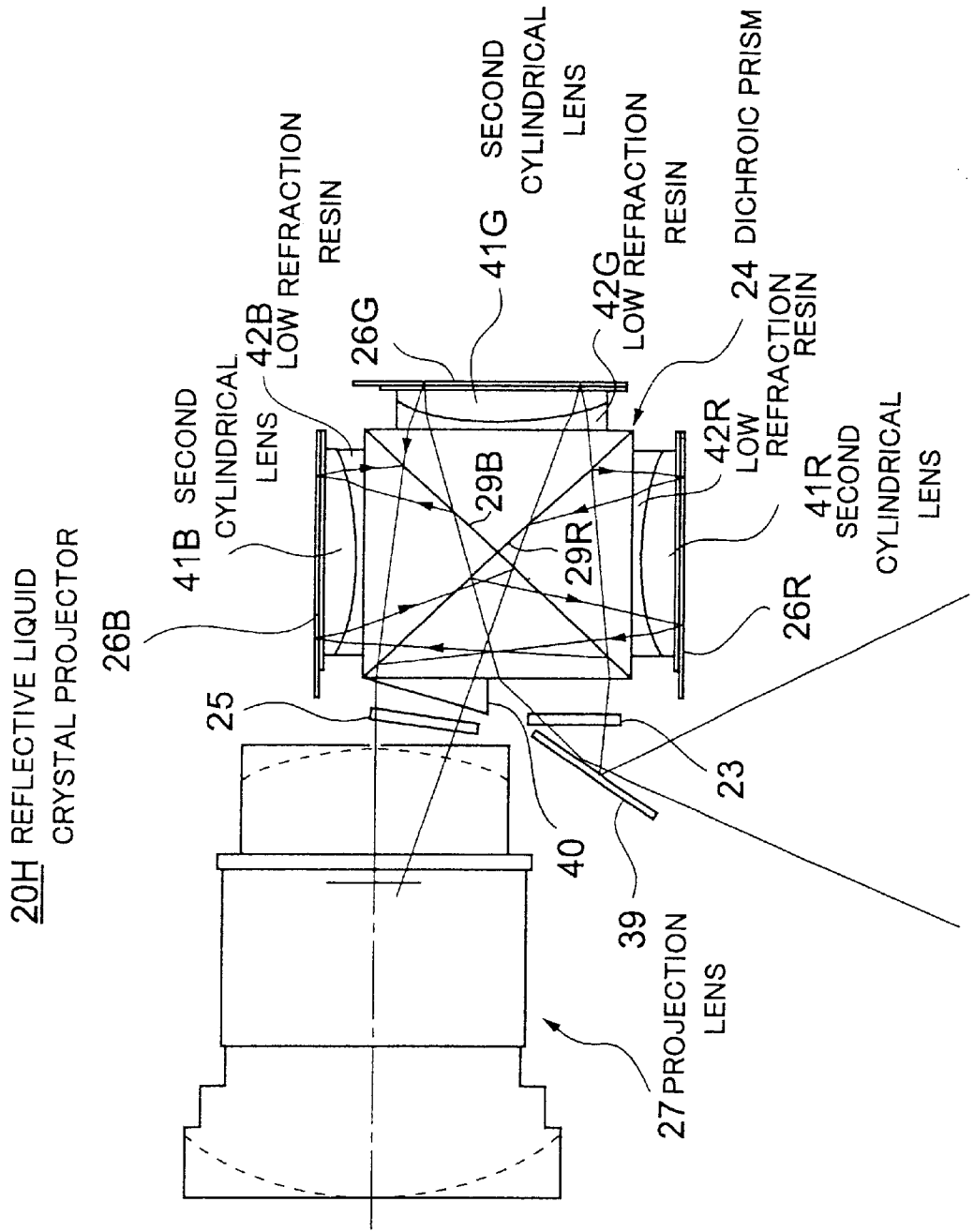
FIG. 9 is a block diagram of a second modification of the reflective liquid crystal projector according to the sixth embodiment of the present invention.

As shown in FIG. 9, transparent materials such as low refraction resin 42R, 42G, and 42B may fill in the space between the convex surface of each of the second cylindrical lenses 41R, 41G, and 41B and the dichroic prism 24 (or reflective liquid crystal panels 26R, 26G, and 26B). Accordingly, the dichroic prism 24, the second cylindrical lenses 41R, 41G, and 41B, and the reflective liquid crystal panels 26R, 26G, and 26B are integrated. In this case, once the reflective liquid crystal panels 26R, 26G and 26B are adjusted during assembly, there is no need to worry about deviation. Therefor, cost reduction for maintaining the projector can be realized.

The reflective liquid crystal projectors 20A–20H of the first to sixth embodiments are configured so that the entering light beam from the light source and the exiting light beam flow along the plane 51 which spreads in the color separation direction of the dichroic prism 24 (the dichroic cross prism) as shown in FIG. 10A.

Figure 10B:
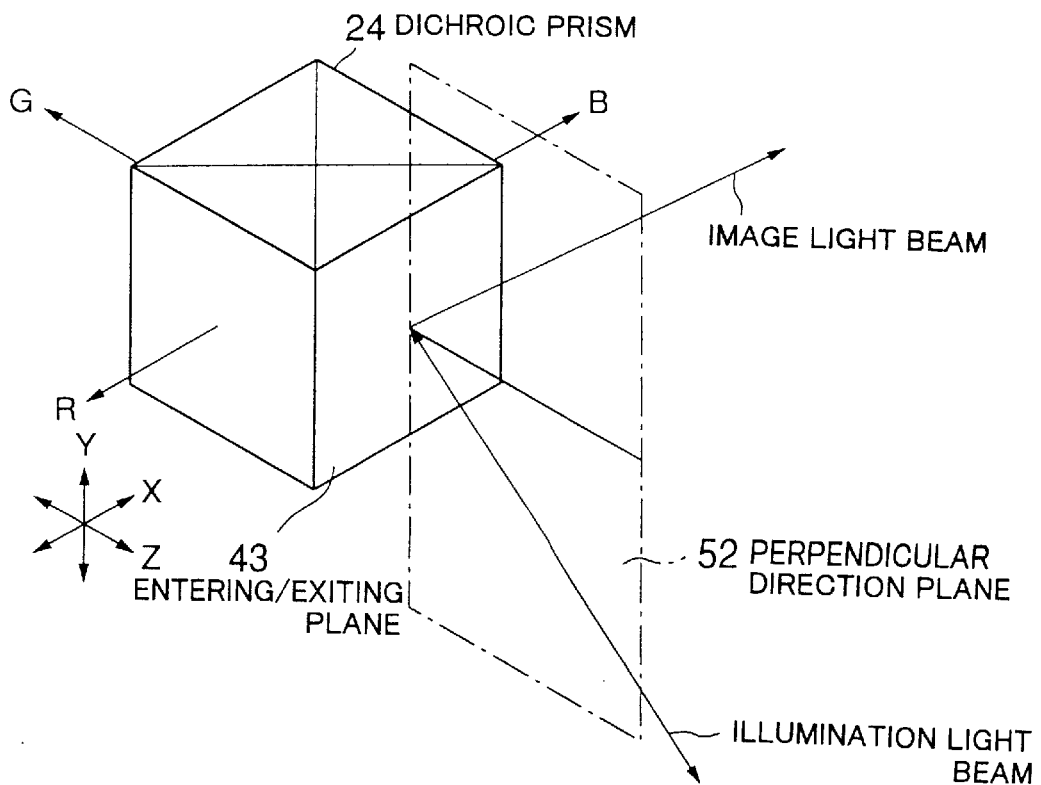
FIG. 10B is a diagram for explaining entering/exiting directions along a perpendicular direction plane of an illumination light beam and an image light beam with respect to a dichroic prism.

On the other hand, as shown in FIG. 10B, reflective projectors 50A–50E of embodiments which will be described below are configured so that the entering light beam from the light source and the exiting light beam flow along a plane 52 which spreads in the direction perpendicular to the color separation direction of the dichroic prism 24. Hereinafter, the plane 52 will be called a perpendicular plane 52. Thus, the direction to the dichroic prism 24 of the entering light beam and the exiting light beam may be the direction along the color separation plane 51 or the direction along the perpendicular plane 52. Miniaturization of the projector can be realized in either case.

In the following, a seventh embodiment of the present invention will be described.

Figure 11A:
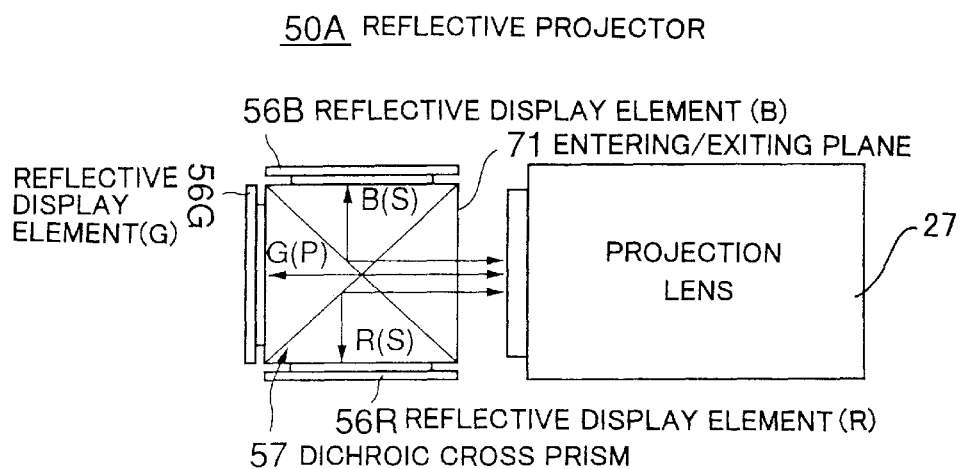
FIG. 11A is a plan view of the reflective liquid crystal projector according to a seventh embodiment of the present invention.
Figure 11B:
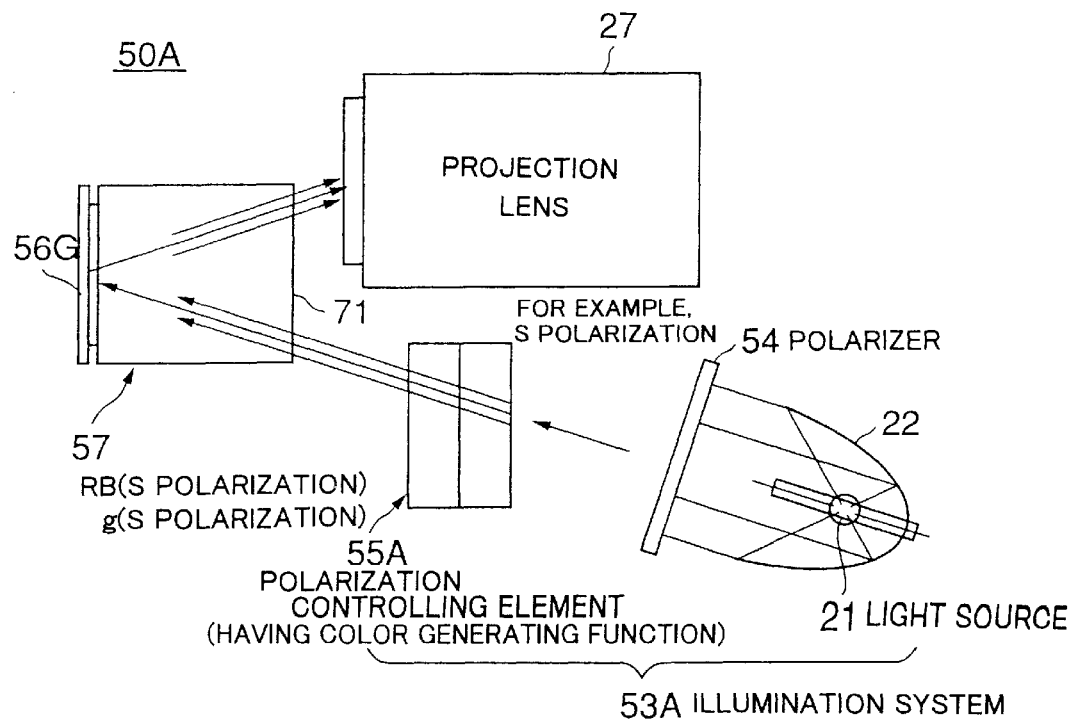
FIG. 11B is a side elevation view of the reflective liquid crystal projector according to the seventh embodiment of the present invention.

FIGS. 11A and 11B show a reflective projector 50A of the seventh embodiment of the present invention. FIG. 11A is a plan view of the projector 50A and FIG. 11B is a side elevation view of the projector 50A.

The reflective projector 50A of the present embodiment includes the light source 21 which generates a irradiation light beam, the reflector 22 which reflects the light beam as a parallel light beam, a polarizer 54 which gives a predetermined polarization characteristics (for example, S polarization) to the irradiation light beam, a dichroic cross prism 57 which has various reflection characteristics depending on polarization, a polarization controlling element 55A which has a color generating function in which a light beam entering into the dichroic cross prism 57 is generated, reflective display elements 56R, 56G, and 56B arranged near the dichroic cross prism 57. The light source 21, the reflector 22, the polarizer 23 and the polarization controlling element 55A form an illumination system 53A.

A small optical system is realized by configuring so that the irradiation light beam enters into the dichroic cross prism 57 and the light beam exits through a same plane that is called an entering/exiting plane 71.

Figure 12:
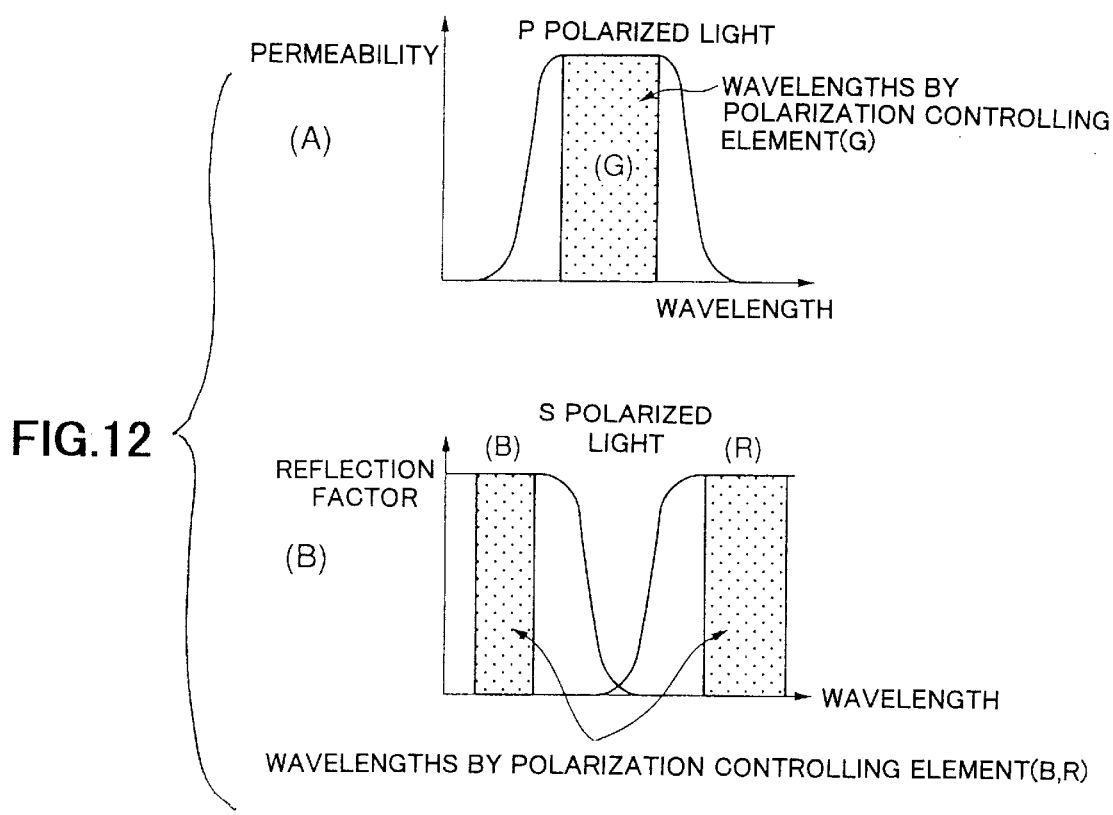
FIG. 12 is a diagram for explaining characteristics of the dichroic cross prism.

The polarization controlling element 55A filters light of wavelengths used by the RGB colors. And, it rotates a polarization vector plane (E) of a desired wavelength light by 90° about the propagation direction of the light. FIG. 12 shows wavelengths generated by the polarization controlling element 55A. Thus generated illumination light has required wavelengths, and a part of the light which has a part of the wavelengths region (for example, G) is formed so as to include light in which the polarization is rotated.

If the illumination light enters into the entering/exiting plane 71 of the dichroic cross prism 57 which functions as a color separation/synthesis part, a G wavelengths light beam which is P polarized passes through the prism 57 and R and B are reflected in each of the color separation direction respectively (refer to FIG. 10A), since the reflection characteristics of the dichroic cross prism 57 differs according to polarization. Here, the reflecting directions of the R and B are different. The illumination light beams impinge on each of the reflective display elements 56R, 56G, and 56B are P polarized light or S polarized light with respect to the polarization vector plane (E) of the passing light beam through the dichroic cross prism 57.

Figure 13:
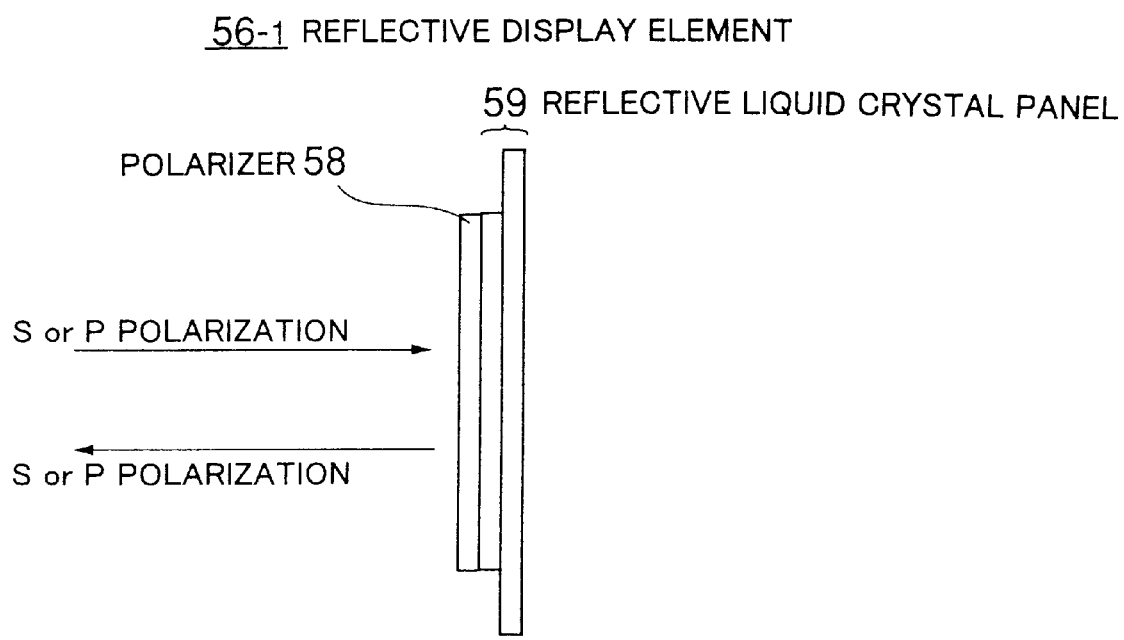
FIG. 13 is a diagram for explaining basic characteristics of a reflective display element.

Image information is superimposed on the illumination light beams impinge on each of the reflective display elements 56R, 56G, and 56B when the illumination light beams are reflected. FIG. 13 shows an example of the reflective display element which can be used as the reflected type display element 56R, 56G, or 56B. As shown in the FIG. 13, the reflective display element 56-1 includes a liquid crystal panel 59 and a polarizer 58, for example.

Therefore, since the polarizer 58 is provided between each of the reflective display elements 56R, 56G, and 56B and the dichroic cross prism 57, only light beams having necessary polarization directions return to the dichroic cross prism 57. The direction of the polarization vector plane (E) of a light beam reflected from the reflective display element 56-1 depends on the direction of the polarization vector plane (E) of an entering light beam. Specifically, if the light beam which enters into the reflective display element 56-1 is S polarization, the reflected light beam is S polarization too.

The light beam reflected by each of the reflective display elements 56R, 56G, and 56B passes through the dichroic cross prism 57 with the same polarization vector plane (E) as the polarization vector plane (E) when entering. After an image is generated from the reflected light beams, the light beam is emitted to the projector lens 27 from the entering/exiting plane 71. Here, the light beam in which an image is formed is called an image light beam. The image light beam forms an image on a screen (not shown in the figure) by the projector lens 27.

In this configuration, since the angle of the exiting image light beam is controlled so as to be different from the entry angle of the illumination light beam to the dichroic cross prism 57, the illumination light beam and the image light beam can be separated. Accordingly, the polarization separation prism conventionally used for separating those light beams becomes unnecessary, and miniaturization of the reflective projector 50A can be realized.

As mentioned above, according to the reflective projector 50A of the present embodiment, since the entering/exiting plane 71 of the dichroic cross prism functions as both of the entering plane of the illumination light beam and the exiting plane of the image light beam, the optical system from the light source 21 to the projection lens 27 can be simplified, and, therefore, miniaturization of the projector can be realized. Further, since the polarization controlling element 55A which has a color generating function has a very sharp separation characteristics when compared with a band pass filter conventionally used as a color synthesis unit, a very sharp projection image with a high quality can be obtained.

Next, each of components of the reflective projector 50A will be described concretely.

Figure 14A:
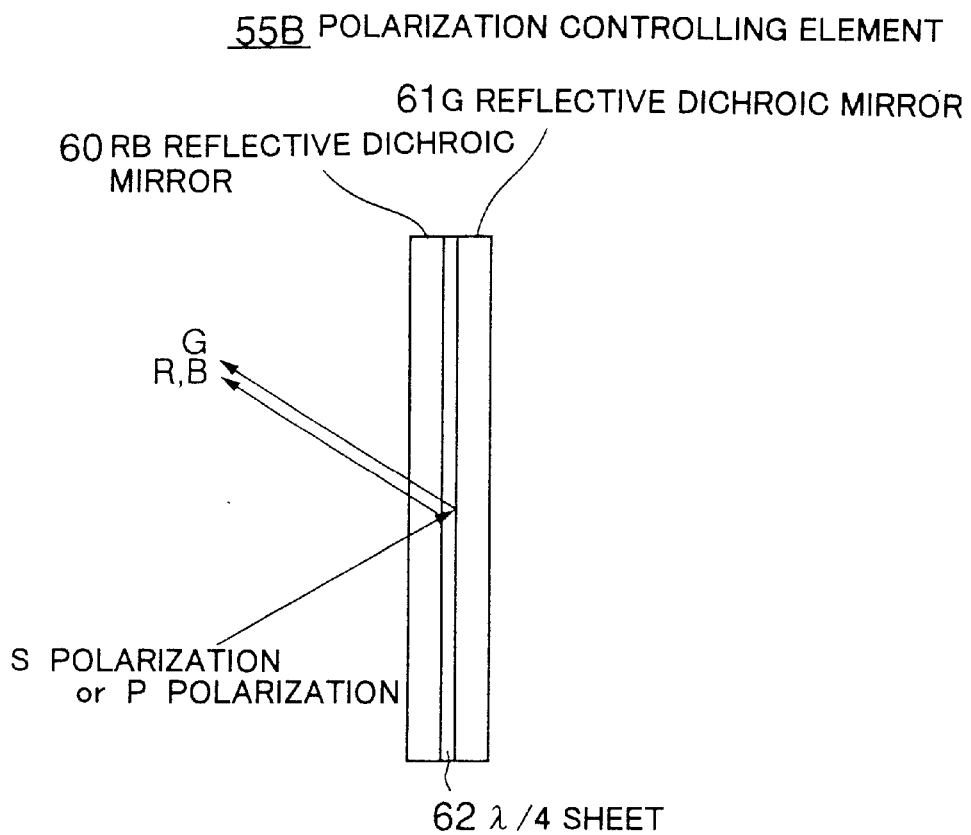
FIG. 14A is a diagram for explaining a first example of a first embodiment of a polarization-controlling element.

FIGS. 14A to 16 show embodiments of the polarization controlling element which has the color 10 generating function. The polarization controlling element 55B shown in FIG. 14A is configured such that a $\lambda/4$ sheet 62 is provided between a plate-like RB reflective dichroic mirror 60 which reflects light of R and B and a plate-like G reflective dichroic mirror 61 which reflects light of G. The $\lambda/4$ sheet 62 is optically joined with each of the dichroic mirrors 60, 61.

Figure 15:
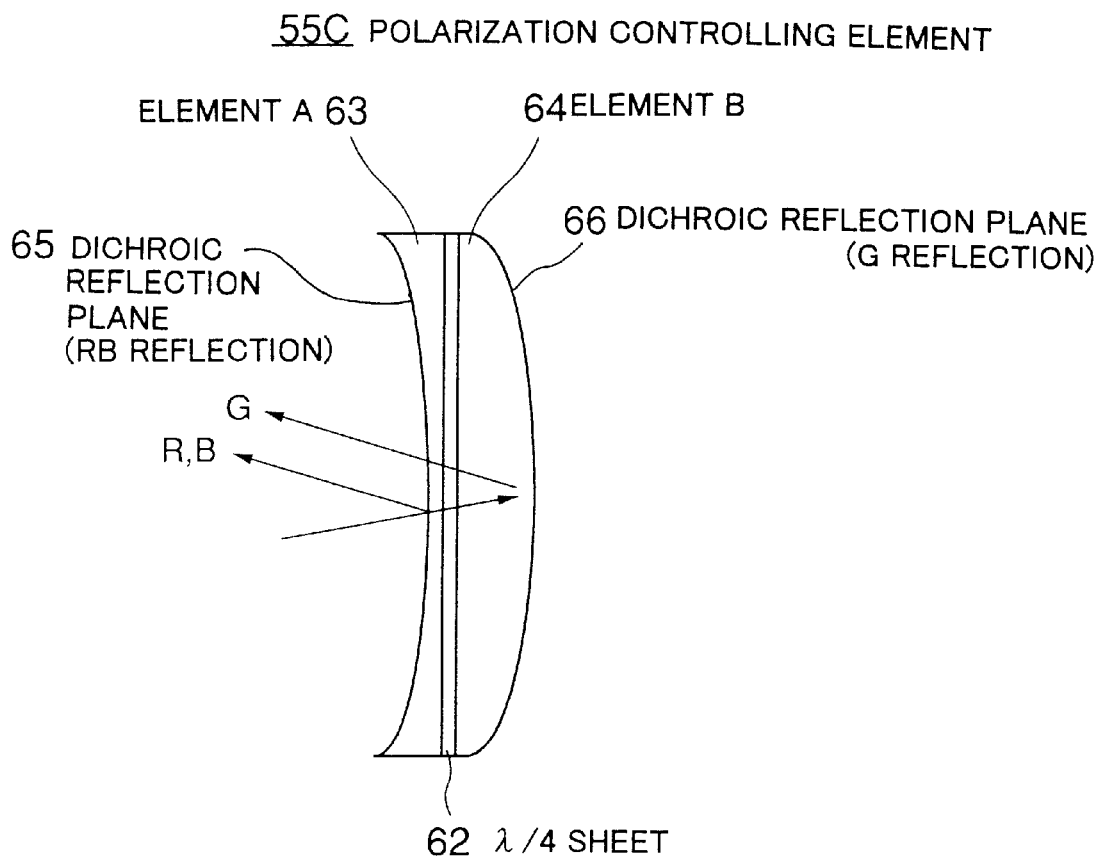
FIG. 15 is a diagram for explaining a second embodiment of the polarization-controlling element.
Figure 16:
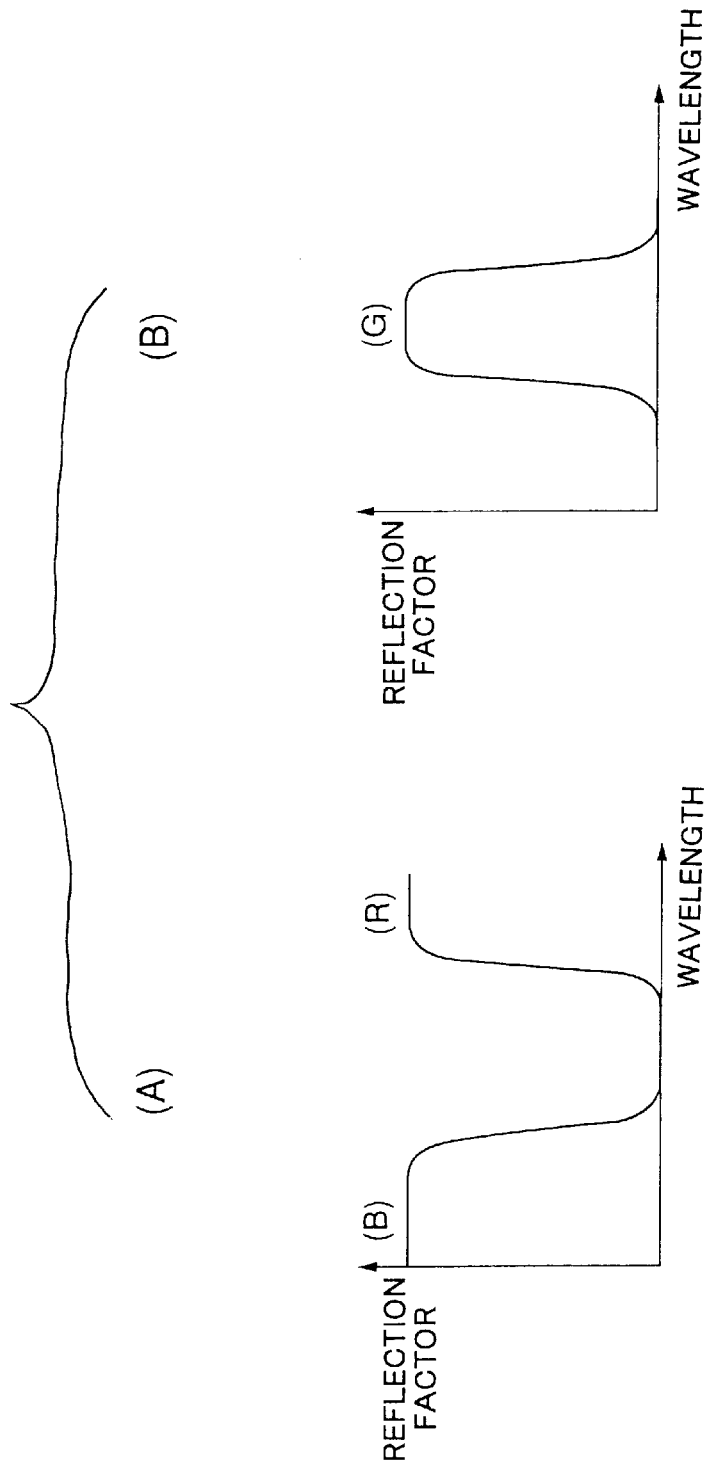
FIG. 16 is a diagram showing reflection characteristics of dichroic mirrors shown in FIGS. 14A, 14B and 14C, and FIG. 15.

The polarization controlling element 55C shown in FIG. 15 is configured such that the $\lambda/4$ sheet 62 is provided between an element A 63 on which a dichroic reflective plane 65 which reflects light of R and B is formed and an element B 64 on which a dichroic reflective plane 66 which reflects light of G is formed. As shown in FIG. 15, the light entering side of the element A 63 has a concave surface and the side in contact with the $\lambda/4$ sheet has a flat surface. As for the element B 64, the side in contact with the $\lambda/4$ sheet has a flat surface and the opposite side has a convex surface. The $\lambda/4$ sheet 62 is optically joined with each of the elements 63, 64. Each of these polarization controlling elements 55B and 55C has reflective characteristics as shown in FIG. 16.

If a light beam in which the polarization vector plane (E) is uniform enters into the above-mentioned polarization controlling element 55B or 55C, the light of RB wavelengths will be reflected by the RB reflective dichroic mirror 60 or the dichroic reflective plane 65 which is located at the light entering side. As for the polarization vector plane (E) of a light beam which has passed through the RB reflective dichroic mirror 60 or the dichroic reflective plane 65 in which the light beam includes the color of G, linear polarization is converted into circular polarization by the $\lambda/4$ sheet 62. As for the circular polarization, only light of desired wavelengths is reflected by the G reflective dichroic mirror 61 or the dichroic reflective plane 66.

The reflected light beam is converted into light which has a polarization vector plane (E) orthogonal to polarization of the entering light beam since the reflected light beam passes through the $\lambda/4$ sheet 62 again. In this way, a light beam which has desired RGB wavelengths in which only the polarization vector plane (E) of G wavelengths light is orthogonal.

In the polarization controlling element 55C shown in FIG. 15, the $\lambda/4$ sheet 62 is inserted between the flat surfaces of the element 63 and 64 so that it can adapt to any dichroic mirror of any shape. Accordingly, it becomes unnecessary to form the $\lambda/4$ sheet 62 in the same shape as the reflection surfaces. Therefore, the polarization controlling element 55C with a high performance and low cost can be realized.

Figure 14B:
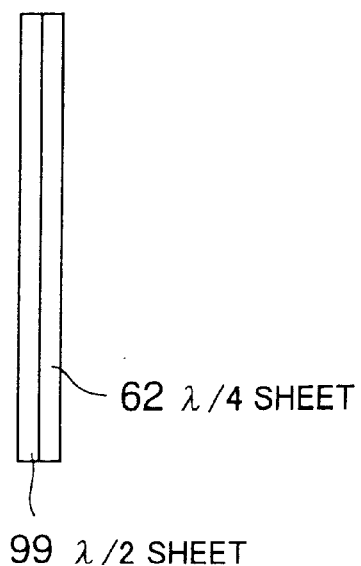
FIG. 14B is a diagram for explaining a second example of the first embodiment of the polarization-controlling element.

In the polarization controlling elements 55B and 55C which form the circular polarization shown in FIGS. 14A–14C and FIG. 15, the $\lambda/4$ sheet 62 of one sheet is provided between a pair of the dichroic mirrors 60 and 61 or between a pair of the dichroic reflective plane 65 and 66. However, the configuration of the polarization controlling element which forms the circular polarization is not limited to this. That is, an array of a $\lambda/2$ sheet 99 and a $\lambda/4$ sheet 62 as shown in FIG. 14B may be provided between a pair of the dichroic mirrors 60 and 61 or between a pair of the dichroic reflective plane 65 and 66 . Further, an array of a plurality of $\lambda/4$ sheets 62A–62C as shown FIG. 14C may be provided.

Figure 23:
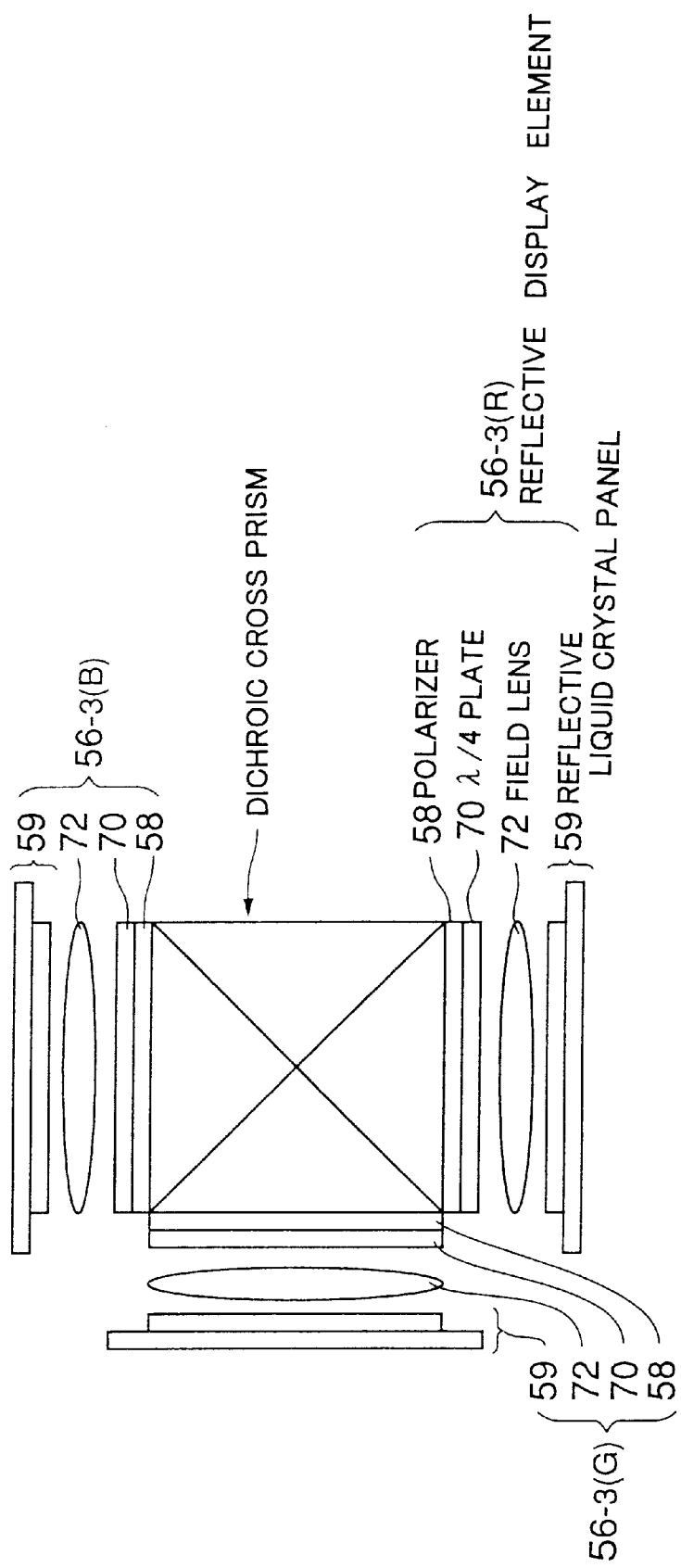
FIG. 23 is a block diagram of a configuration in which a polarizer and a λ/4 plate are provided on surfaces of a dichroic cross prism.
Figure 24A:
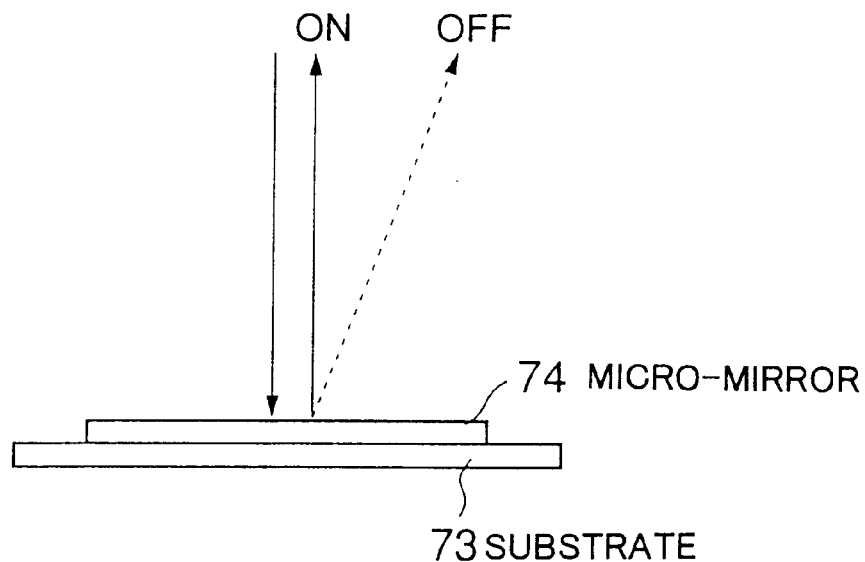
FIG. 24A is a diagram for explaining a third embodiment of the reflective display element.
Figure 24B:
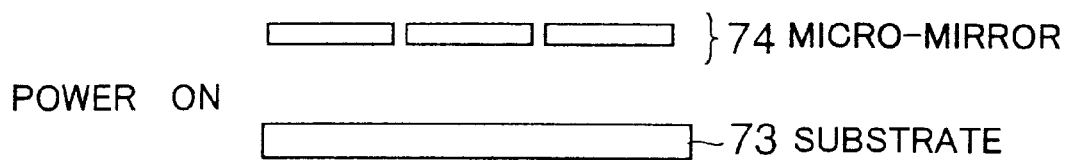
Figure 24C:
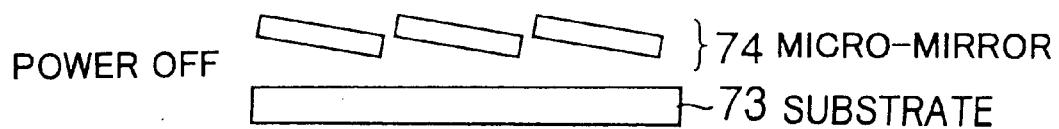
FIG. 24C is a diagram showing the third embodiment of the reflective display element when power is turned off.

FIGS. 17–24C show embodiments of the reflective display elements 56R, 56G, and 56B. FIGS. 17–23 shows embodiments which use a reflective liquid-crystal panel 59, and FIGS. 24A–24C show an embodiment which uses a micro-mirror device.

Figure 17:
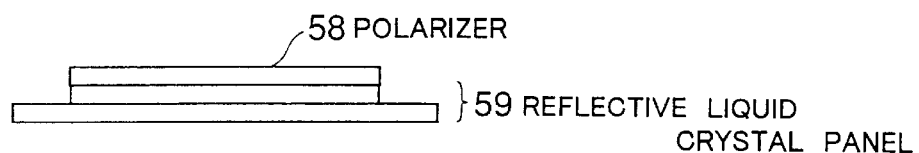
FIG. 17 is a first diagram for explaining a first embodiment of the reflective display element.
Figures 18A, 18B:
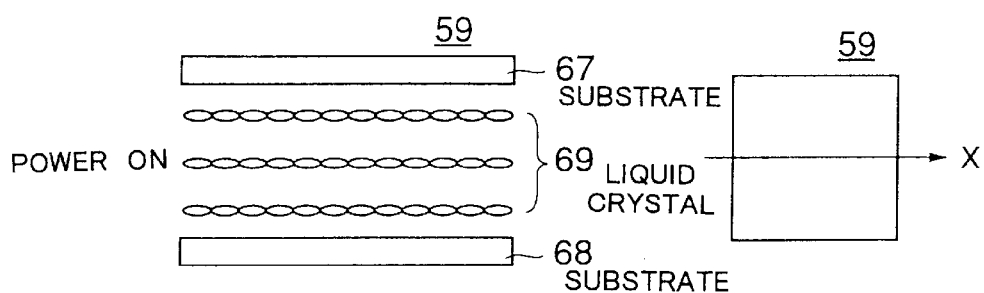
FIG. 18A is a second diagram for explaining the first embodiment of the reflective display element showing a sectional side elevational view.
FIG. 18B is a third diagram for explaining the first embodiment of the reflective display element showing a plan view.
Figures 19A, 19B:
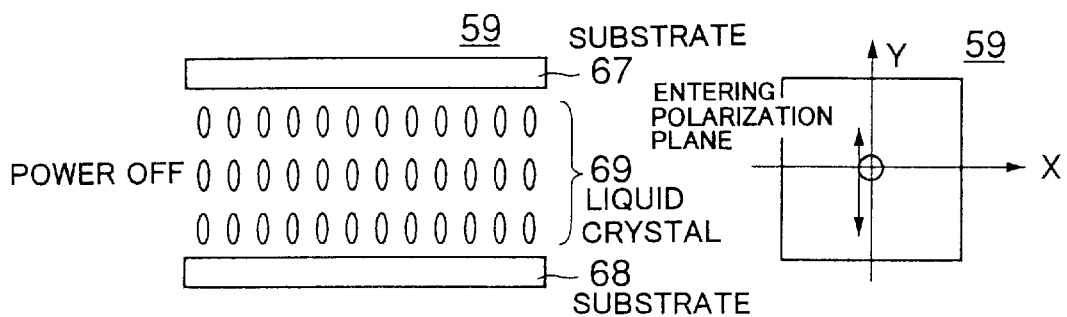
FIG. 19A is a fourth diagram for explaining the first embodiment of the reflective display element showing a sectional side elevation.
FIG. 19B is a fifth diagram for explaining the first embodiment of the reflective display element showing a plan view.
Figure 20:
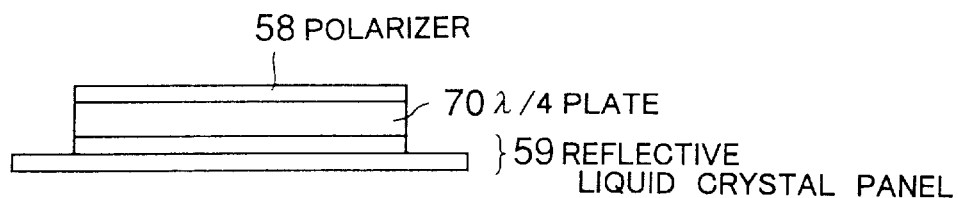
FIG. 20 is a first diagram for explaining a second embodiment of the reflective display element.
Figure 21A:
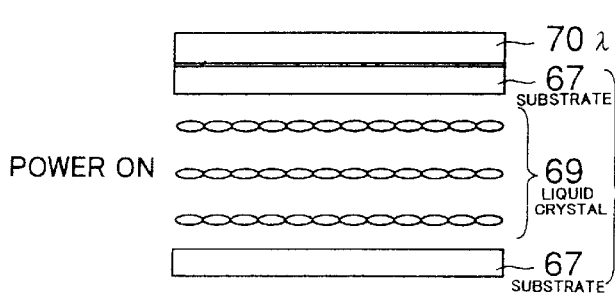
FIG. 21A is a second diagram for explaining the second embodiment of the reflective display element showing a sectional side elevational view.
Figure 21B:
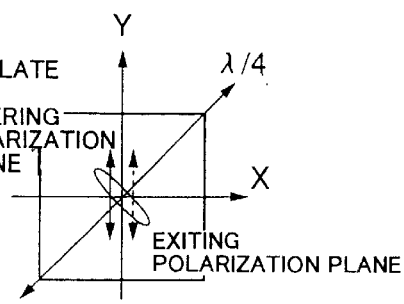
FIG. 21B is a third diagram for explaining the second embodiment of the reflective display element showing a plan view.
Figure 22A:
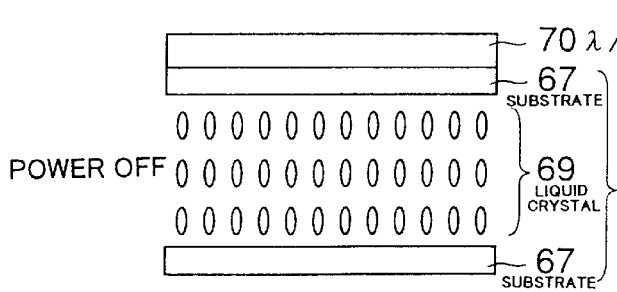
FIG. 22A is a fourth diagram for explaining the second embodiment of the reflective display element showing a sectional side elevational view.
Figure 22B:
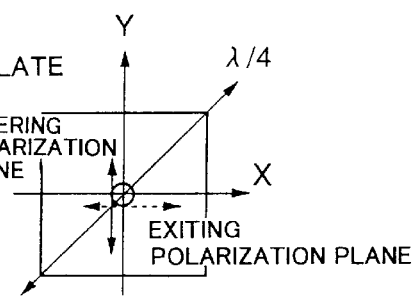
FIG. 22B is a fifth diagram for explaining the second embodiment of the reflective display element showing a plan view.

The reflective display device 56-1 shown in FIGS. 17 or 19A is formulated by the reflective liquid crystal panel 59 and the polarizer 58. The reflective liquid crystal panel 59 is configured such that liquid crystal 69 is sealed in the space between substrates 67 and 68. The reflective display element 56-2 shown in FIGS. 20–22A is configured such that a $\lambda/4$ plate 70 is provided between a polarizer 58 and a reflective liquid crystal panel 59 in the reflective display element 56-1 shown in FIGS. 17–19A, in which a polarizer 58 and a $\lambda/4$ plate 70 functions as a element for light intensity modulation. FIGS. 18A, 18B and 21A, 21B show a status of the liquid crystal in which a voltage is applied, and FIGS. 19A, 19B and 22A, 22B show a status of the liquid crystal in which a voltage is not applied.

By the way, as described above, each of the reflective display elements 56R, 56G, and 56B needs to have a function for reflecting light while keeping the direction of the polarization vector plane (E) of the light.

In the reflective display element 56-1 shown in FIGS. 17–19A, the reflective liquid crystal panel 59 has a function of $\lambda/4$ phase modulation, as a result, it has a function equivalent to $\lambda/2$ phase modulation during round trip. The intensity modulation is performed by controlling voltage applied to the liquid crystal 69.

On the other hand, in the reflective display element 56-2 shown in FIGS. 20–22A, the function of the $\lambda/4$ phase modulation in the reflective display element 56-1 is realized by a $\lambda/4$ plate 70 (phase sheet). The reflective liquid crystal panel 59 performs the intensity modulation by changing the degree of the polarization.

In the above-mentioned embodiment, the $\lambda/4$ plate 70 is used as a phase sheet. However, the phase sheet is not limited to a plate. A sheet-like thing or a configuration in which $\lambda/2$ sheets are piled up for correction can also be used.

Furthermore, the polarizer 58 and the phase sheet 70 are not necessarily provided on the reflective liquid crystal display panel 59. For example, the polarizer 58 and the phase sheet 70 may be provided on the dichroic cross prism 57 as shown in FIG. 23. FIG. 23 shows a configuration in which the polarizer as well as the $\lambda/4$ plate 70 are provided on the dichroic cross prism 57.

FIGS. 24A–24C shows a reflective display element 56-4 which has a micro-mirror device. The reflective display element 56-4 shown in FIGS. 24A–24C has many micromirrors 74 each of which micro-mirror is provided on the substrate 73 by pixel.

The micro-mirror 74 keeps parallel with respect to the substrate 73 by a driving unit (not shown in the figure) when the power is turned on as shown in FIG. 24B, and, the micro-mirror 74 is located such that it has a predetermined angle with respect to the substrate 73 as shown in FIG. 24C when the power is turned off. In the reflective display element 56-4 having the micro-mirror 74, since a entering light beam is reflected by the micro-mirror 74, the polarization vector plane (E) of the reflected light beam is maintained. The intensity modulation can be realized by controlling the time of the power ON-OFF to the driving unit for driving the micro-mirror 74.

Figure 25A:
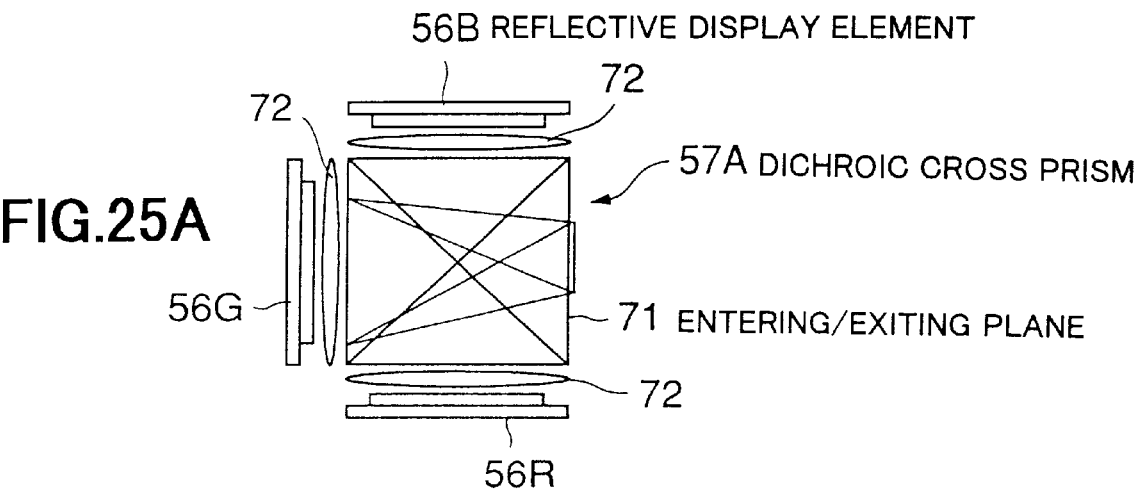
FIG. 25A is a plan view of a dichroic prism in which a light entering area and a light exiting area on a entering/exiting plane are separated.
Figure 25B:
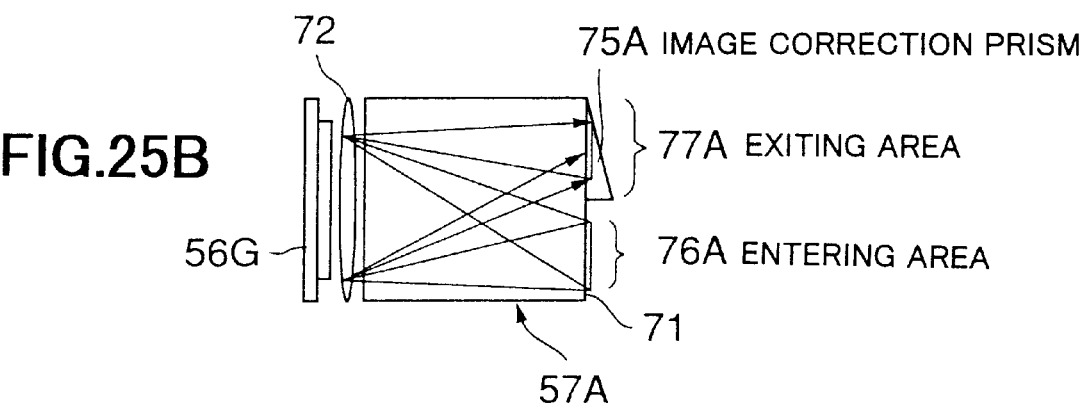
FIG. 25B is a side elevational view of the dichroic prism in which the light entering area and the light exiting area on the entering/exiting plane are separated.
Figure 26A:
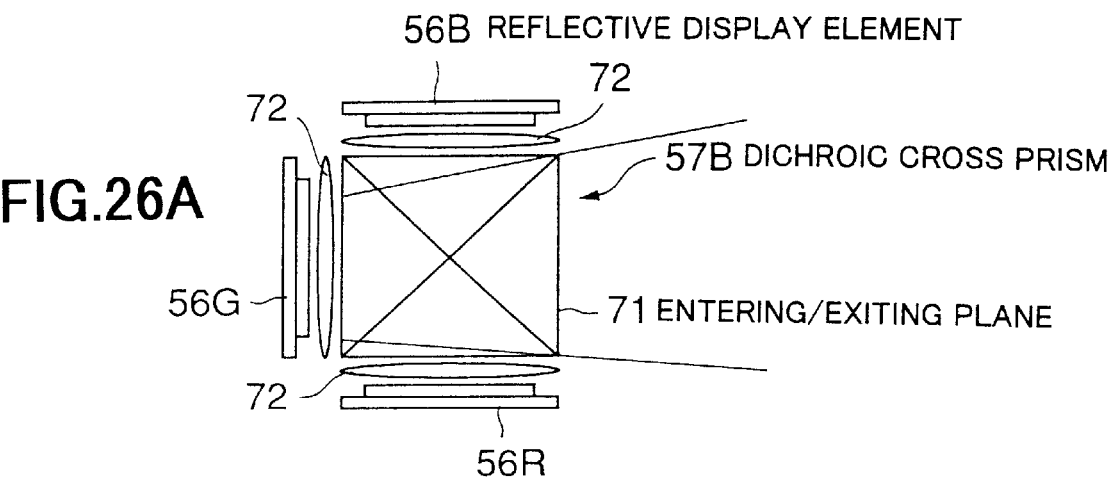
FIG. 26A is a plan view of a dichroic prism in which the light entering area and the light exiting area on a entering/exiting plane are overlapped.
Figure 26B:
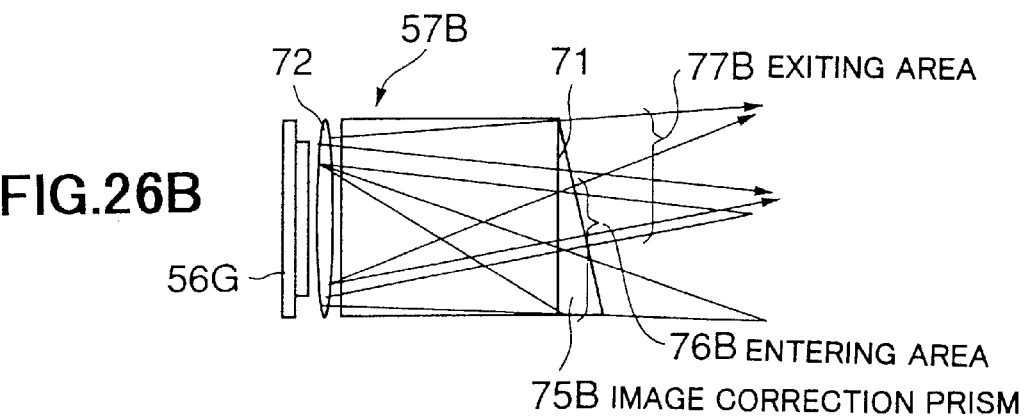
FIG. 26B is a side elevational view of a dichroic prism in which a light entering area and a light exiting area on a entering/exiting plane are overlapped.

FIGS. 25A, 25B and 26A, 26B show embodiments of the dichroic cross prism and entering/exiting light beams of this dichroic cross prism. Here, in every embodiments, the entering plane of an illumination light beam and the exiting plane of an image light beam are the entering/exiting plane 71 which is one of the surfaces of the dichroic cross prism 57A or 57B. Each of FIGS. 25A and 26A is a plan view of the dichroic cross prism 57A, 57B, and each of FIGS. 25B and 26B is a side elevation view.

In the embodiment shown in FIGS. 25A and 25B, the entering area 76A into which an illumination light beam enters and the exiting area 77A from which an image light beam exits are spatially separated and are independent of each other on the plane 71 of the dichroic cross prism 57A. At this time, since the image light beam exits from the plane 71 of the dichroic cross prism 57A in a slanting direction, the reflective display elements 56R, 56G, and 56B are looked at in a slanting direction through glass of the dichroic cross prism 57A. Therefore, trapezoidal distortion may occur. Therefore, in order to correct the distortion, an image distortion correction prism 75A is provided on the exiting area 77A. Hereinafter, the dichroic cross prism 57A shown in FIGS. 25A and 25B will be called a separation type dichroic cross prism 57A.

In the embodiment shown in FIGS. 26A and 26B, the illumination light beam and the image light beam are separate and independent of each other because of the difference of the angle of the beams with respect to the plane 71 of the dichroic cross prism 57A. In this embodiment, since it is impossible to separate the entering area 76B into which the illumination light beam enters and the exiting area 77B from which the image light beam exits, the entering area 76B and the exiting area 77B are overlapped each other on the plane 71 of the dichroic cross prism 57A (refer to FIG. 26B). Therefore, an image distortion correction prism 75B is provided on the whole plane 71 of the dichroic cross prism 57B. Hereinafter, the dichroic cross prism 57B shown in FIGS. 26A and 26B will be called an overlap type dichroic cross prism 57B.

Next, embodiments of the reflective projector in which above-mentioned components are combined will be described with reference to the FIGS. 27A–30B. Each of FIGS. 27A, 28A, 29A and 30A shows a schematic plan view of the reflective projector, and each of FIGS. 27B, 28B, 29B and 30B shows a schematic side elevation view of the reflective projector.

Figures 27A, 27B:
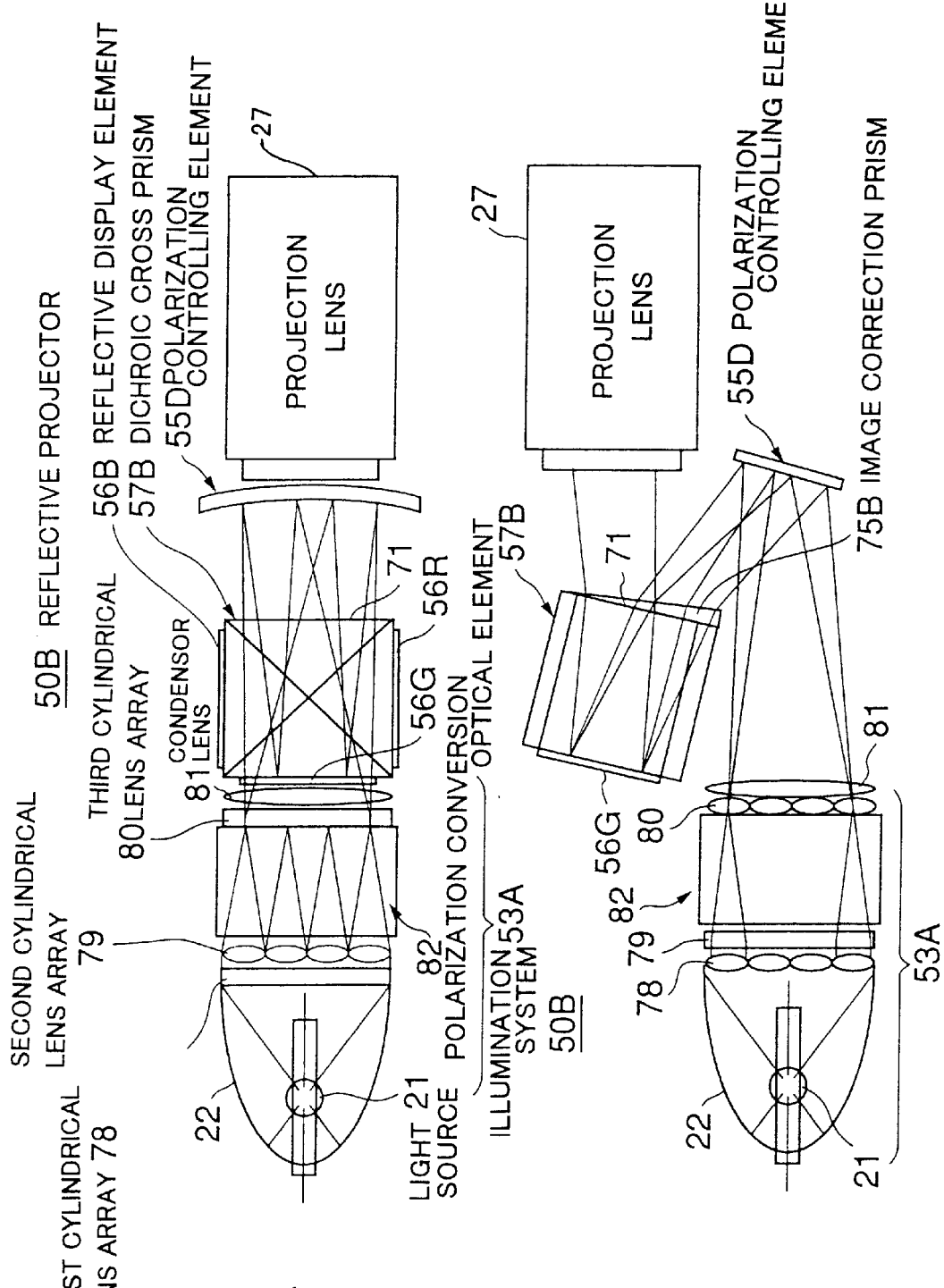
FIG. 27A is a schematic plan view of the reflective liquid crystal projector according to an eighth embodiment of the present invention.
FIG. 27B is a schematic side elevational view of the reflective liquid crystal projector according to the eighth embodiment of the present invention.

FIGS. 27A and 27B show a reflective projector 50B of an eighth embodiment. The reflective projector 50B shown in FIGS. 27A and 27B includes a polarization controlling element 55D which has the same function as the polarization controlling element 55C shown in FIG. 15 and which is modified from the element 55C such that the shape of the side elevation view may become like a plate, and the overlap type dichroic cross prism 57B shown in FIGS. 26A and 26B. The polarization controlling element 55D has a cylindrical surface.

The illumination light beam which is emitted from the light source 21 which forms the illumination system 53A is converted into a parallel light beam by the paraboloid reflector 22. After that, the parallel light beam impinges on each of the reflective display elements 56R, 56G, and 56B by an anamorphic system in which magnification of the horizontal direction is different from that of the perpendicular direction. A first cylindrical lens array 78, a third cylindrical lens array 80, and a condenser lens 81 function in the perpendicular direction, in other words, in the vertical direction in FIG. 27B. The image of the aperture shape of the first cylindrical lens array 78 is formed on each of the reflective display elements 56R, 56G and 56B by the third cylindrical lens array 80 and by the condenser lens 81. Here, the condenser lens 81 gathers the chief ray of the light beam from each of the lens arrays 78 and 80 on the center of each of the reflective display elements 56R, 56G, and 56B.

On the other hand, a second cylindrical lens array 79, a polarization conversion optical element 82, a condenser lens 81, and the polarization controlling element 55D which has a cylindrical surface function in the horizontal direction, in other words, in the vertical direction in FIG. 27A. As will be described with reference to FIG. 34, the polarization conversion optical element 82 uses a calcite 91 which is a uniaxial crystal as a polarization separation element. A light beam with a desired direction plane of polarization can be generated after one polarized light beam of the illumination light beams separated by this calcite 91 passes through the array like $\lambda/2$ plate 89.

The illumination light beam which forms an image on the second cylindrical lens array 79 is converted into light having polarization vector plane (E) of a uniform direction by the polarization conversion optical element 82, and, the light beam emits from the element 82 like light beams from a plurality of line sources or point sources. The light beam forms an image on each of the reflective display elements 56R, 56G and 56B by the condenser lens 81.

Further, the cylindrical shape of the surface and the rear face of the polarization controlling element 55D which has the color generating function converts a light beam from each of the line sources into a parallel light beam. Therefore, a light beam with desired wavelengths and polarization vector plane (E) of desired direction enters into the entering/exiting plane 71 of the overlap type dichroic cross prism 57B by the polarization controlling element 55D.

The entered illumination light beam is separated into three colors (R, G, B) by the overlap type dichroic cross prism 57B, and each color goes out from the corresponding surface. As was shown in FIG. 23, the polarizer 58 and the $\lambda/4$ plate 70 are provided on the surfaces of the overlap type dichroic cross prism 57B in this order in which each of the surfaces faces one of the reflective display elements 56R, 56G and 56B.

The light beam reflected by each of the reflective display elements 56R, 56G, and 56B is superimposed by the overlap type dichroic cross prism 57B, and, then, the light beam is emitted from the entering/exiting plane 71 to the projector lens 27. The projector lens 27 projects an image formed by the reflective display elements 56R, 56G, and 56B while enlarging the image.

As shown in FIG. 23, spread of a light beam can be suppressed by providing the field lens 72 in front of the liquid crystal display panel 59. Also, the aperture of the projector lens 27 can be made small by doing so. Thereby, miniaturization of the reflective projector 50B can be realized.

Three cylindrical lens arrays are used in this embodiment. However, the first cylindrical lens array 78 and the second cylindrical lens array 79 can be formed as a lens array on a same substrate.

Furthermore, the setting position of the cylindrical lens arrays 78, 80 and the polarization conversion optical element 55D which function horizontally, and the setting position of the cylindrical lens array 79 which functions perpendicularly can be changed by choosing focal lengths. Any elements can be utilized as the reflective display elements 56R, 56G, and 56B as long as the elements reflect light beams without disturbing polarization. For example, the reflective display element 56-4 having the micro-mirror 74 previously described with reference to FIGS. 24A–24C can be used.

Figures 41A, 41B:
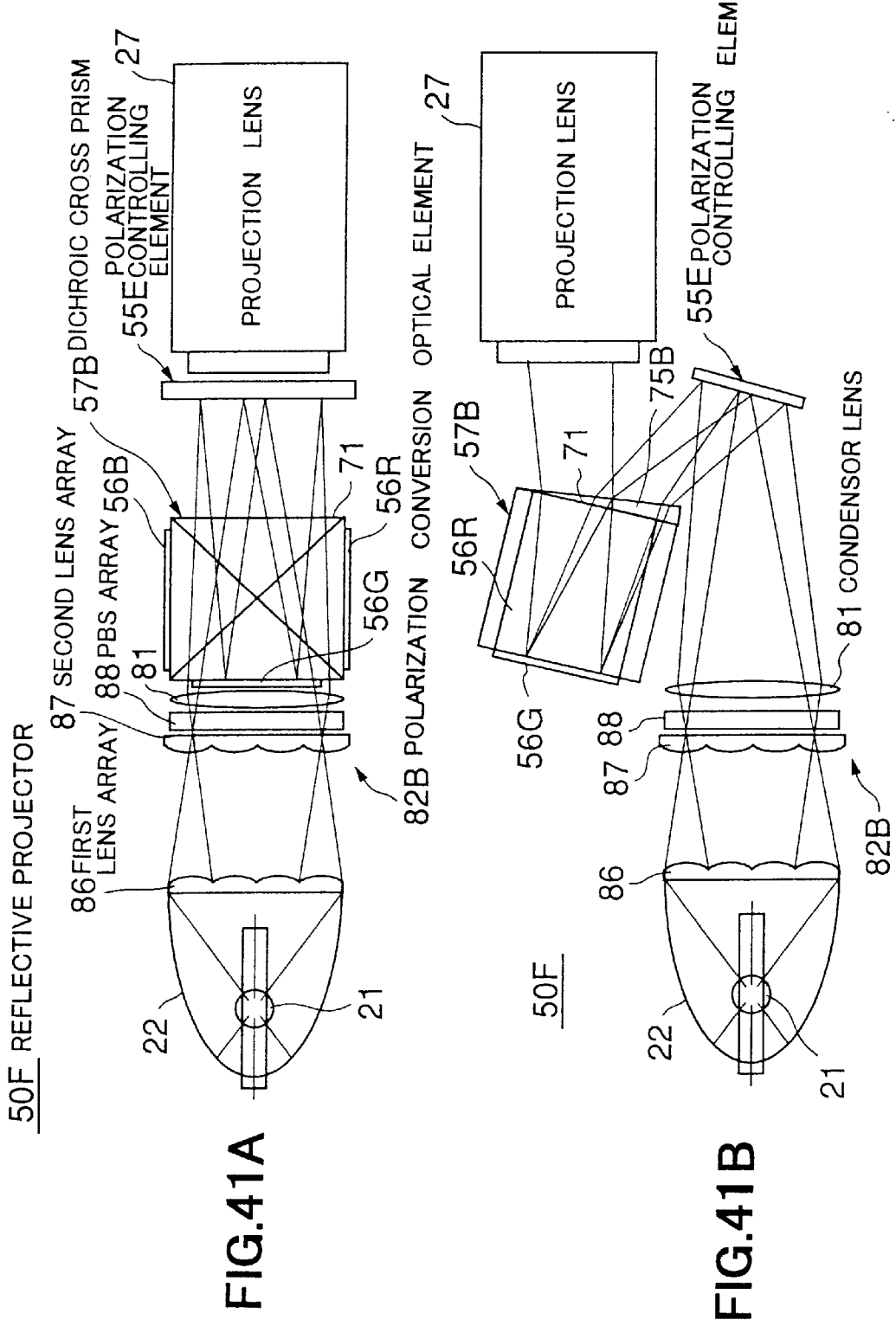
FIG. 41A is a schematic plan view of the reflective liquid crystal projector according to a modification of the eighth embodiment of the present invention.
FIG. 41B is a schematic side elevational view of the reflective liquid crystal projector according to a modification of the eighth embodiment of the present invention.

In the following, a modification of the reflective projector 50B of the above eighth embodiment will be described. FIGS. 41A and 41B show a reflective projector 50F which is the modification of the reflective projector 50B of the eighth embodiment.

As was described before, the reflective projector 50B of the eighth embodiment has the calcite 91 which is a uniaxial crystal as a polarization conversion optical element 82. On the other hand, the reflective projector 50F of this modification includes a polarization conversion optical element 82B which will be described with reference to FIG. 32 below.

The polarization conversion optical element 82B includes a first lens array 86, a second lens array 87, a polarization separation prism array 88 which will be called a PBS array hereinafter. Further, a strip like λ/2 plate 89 is provided in the side of the second lens array 87 which side faces the condenser lens 81. The lens aperture of the first lens array 86 is configured so that the image forms on the second lens array 37. The condenser lens 81 gathers light beams from a plurality of lenses which form the second lens array 37 to one area, and forms a rectangular illumination area on each of the reflective display elements 56R, 56B and 56G.

According to the reflective projector 50F, since the illumination area can be formed rectangular on each of the reflective display elements 56R, 56B and 56G by the polarization conversion optical element 82B, the polarization controlling element 55E can be formed like a flat panel. Therefore, the part cost of the polarization controlling element 55E is reduced and the adjustment cost decreases because the adjustment of the center becomes unnecessary.

Figures 28A, 28B:
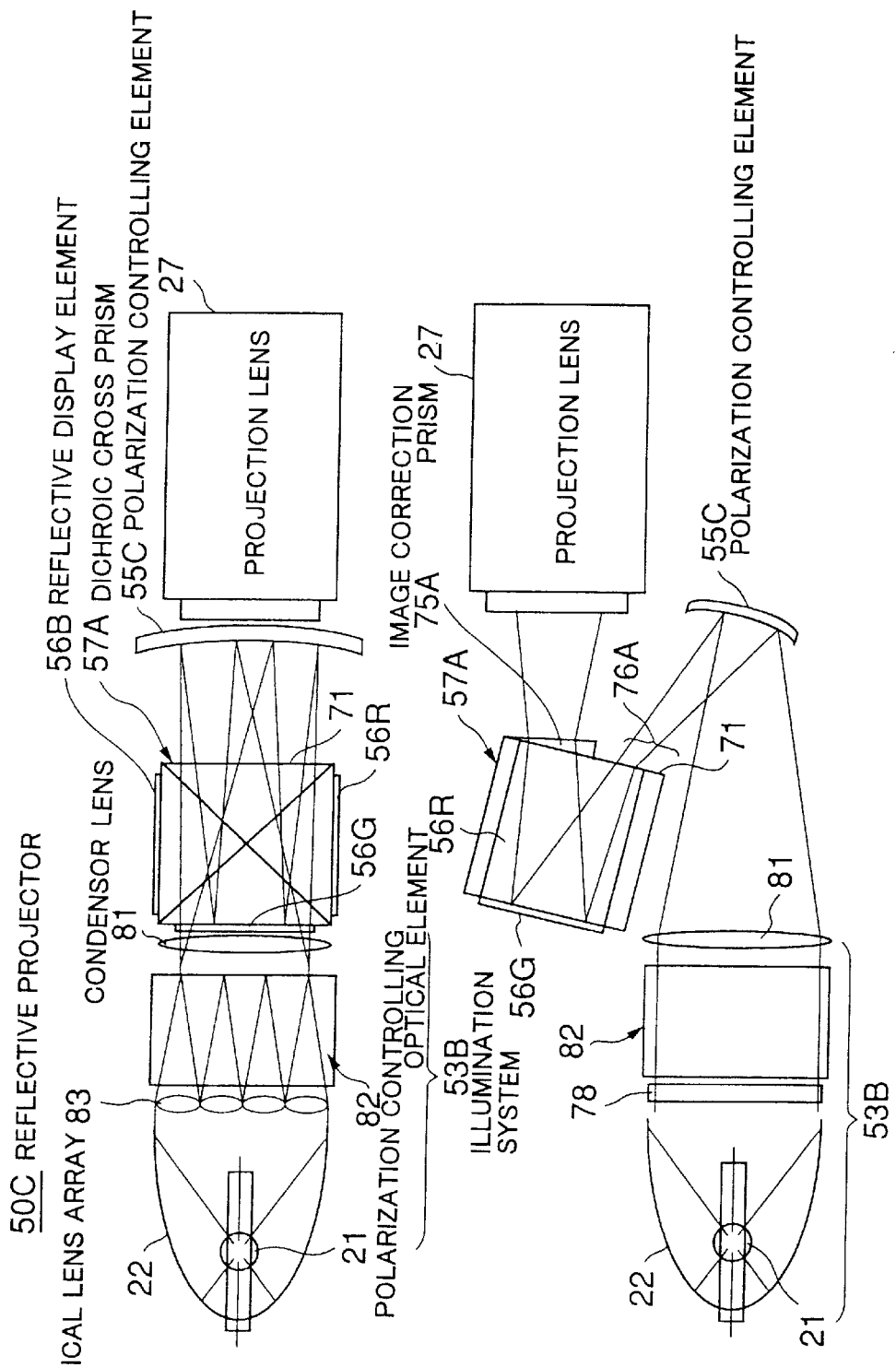
FIG. 28A is a schematic plan view of the reflective liquid crystal projector according to a ninth embodiment of the present invention.
FIG. 28B is a schematic side elevational view of the reflective liquid crystal projector according to the ninth embodiment of the present invention.

Next, a reflective projector 50C of a ninth embodiment will be described with reference to FIGS. 28A and 28B.

The reflective projector 50C of the embodiment includes the polarization controlling element 55C shown in FIG. 15 as a polarization controlling element and the separate type dichroic cross prism 57A shown in FIGS. 25A and 25B as a dichroic cross prism.

The illumination light beam which is emitted from the light source 21 is converted into a parallel light beam by the paraboloid reflector 22, and enters into the entering/exiting plane 71 of the separate type dichroic cross prism 57A through a cylindrical lens array 83, the polarization conversion optical element 82 and the condenser lens 81, and, then, impinges on each of the reflective display elements 56R, 56G, and 56B.

The operation of the illumination system 53B is the same as that of the reflective projector 50B of the eighth embodiment shown in FIGS. 27A and 27B. In this embodiment, the shape of the side elevation view of the polarization controlling element 55C is like a curved plate. Therefore, the illumination light beam impinges on the entering area 76A of the separate type dichroic cross prism 57A.

The illumination light is separated into three colors (R, G, B) in the separate type dichroic cross prism 57A. After that, each light of the colors (R, G, B) is emitted from the corresponding surface of the prism 57A toward each of the reflective display elements 56R, 56G, and 56B. The light beams reflected by each of the reflective display elements 56R, 56G, and 56B are synthesized in the separate type dichroic cross prism 57A into an image light beam, and the image light beam is emitted from the entering/exiting plane 71 toward the projector lens 27. The projector lens 27 projects the image light beam formed by the reflective display elements 56R, 56G, and 56B while enlarging the image.

FIGS. 42A and 42B show a reflective projector 50G which is a modification of the reflective projector 50C of the above-mentioned ninth embodiment.

Figure 32:
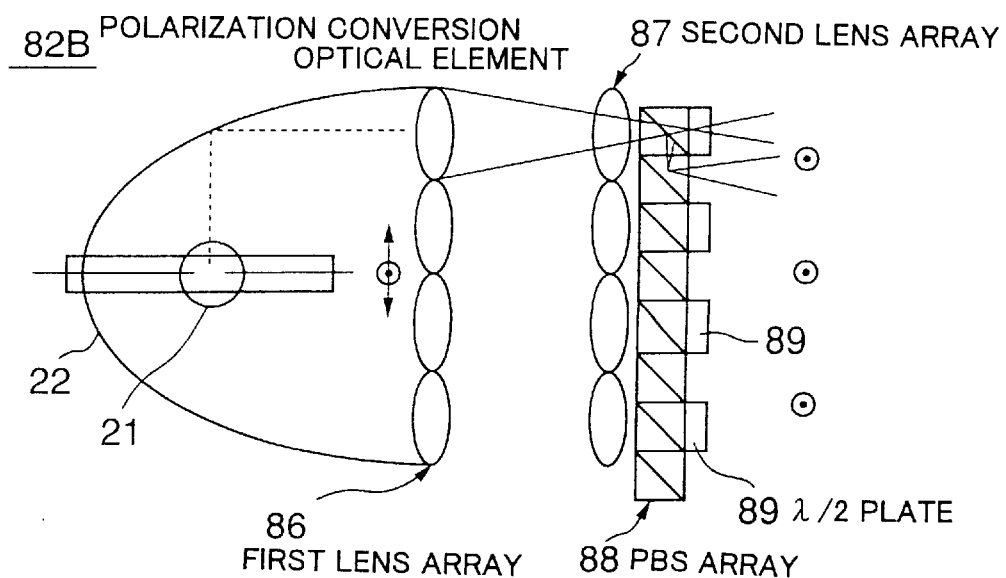
FIG. 32 is a diagram for explaining a second embodiment of the polarization conversion optical element.

The reflective projector 50G of this modification includes a polarization conversion optical element 82B which is shown in FIG. 32 like the reflective projector 50F shown in FIGS. 41A and 41B. The lens aperture of the first lens array 86 is configured so that an image forms on the second lens array 37. The condenser lens 81 gathers light beams from a plurality of lenses which forms the second lens array 37 to one area, and forms a rectangular illumination area on each of the reflective display elements 56R, 56B and 56G.

According to the reflective projector 50G, the polarization controlling element 55E can be formed like a flat panel. Therefore, the part cost of the polarization controlling element 55E is reduced and the adjustment cost decreases because the adjustment of the center becomes unnecessary.

Next, the reflective projector 50D of a tenth embodiment will be described with reference to FIGS. 29A and 29B.

Figure 14C:
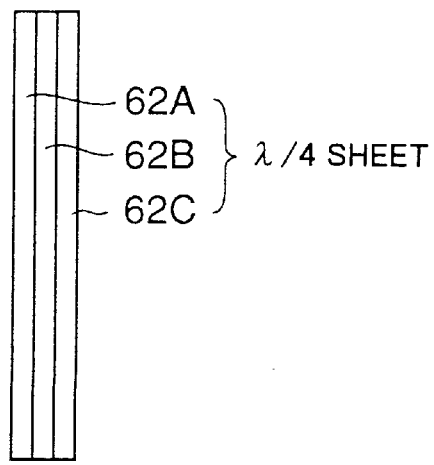
FIG. 14C is a diagram for explaining a third example of the first embodiment of the polarization-controlling element.

The reflective projector 50D of the embodiment includes the plate like polarization controlling element 55B shown in FIGS. 14A–14C as a polarization controlling element and the overlap type dichroic cross prism 57B as a dichroic cross prism.

The illumination light beam which is emitted from the light source 21 which forms the illumination system 53C is converted into a parallel light beam by the paraboloid reflector 22. After that, the parallel light impinges on each of the reflective display elements 56R, 56G, and 56B by an anamorphic system in which the magnification of the horizontal direction is different from that of the perpendicular direction. A first cylindrical lens array 78, a third cylindrical lens array 80, a condenser lens 81 and a curved mirror 84 function in the perpendicular direction, in other words, in the vertical direction in FIG. 29B. Here, the condenser lens 81 and the curved mirror 84 gathers the chief ray of the light beam from each of the lens arrays 78 and 80 on the center of each of the reflective display element 56R, 56G, and 56B.

On the other hand, a second cylindrical lens array 79, a polarization conversion optical element 55B, a condenser lens 81, and the curved mirror 84 function in the horizontal direction, in other words, in the vertical direction in FIG. 29 (A). The illumination light beam which forms an image on the second cylindrical lens array 79 is converted into light having polarization vector plane (E) of a uniform direction by the polarization conversion optical element 55B, and emits from the element 55B like light beams from a plurality of line sources or point sources. The illumination light beam forms an image on each of the reflective display elements 56R, 56G and 56B by unit of the condenser lens 81.

Figure 29A:
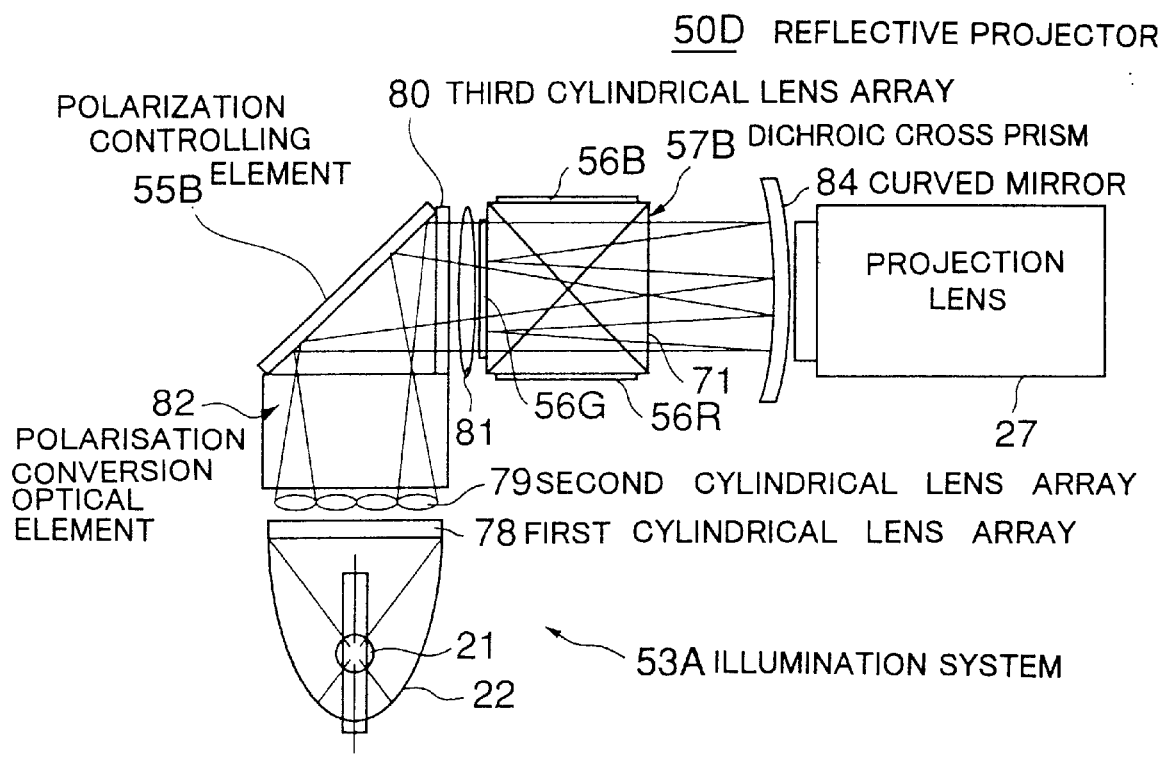
FIG. 29A is a schematic plan view of the reflective liquid crystal projector according to a tenth embodiment of the present invention.
Figure 29B:
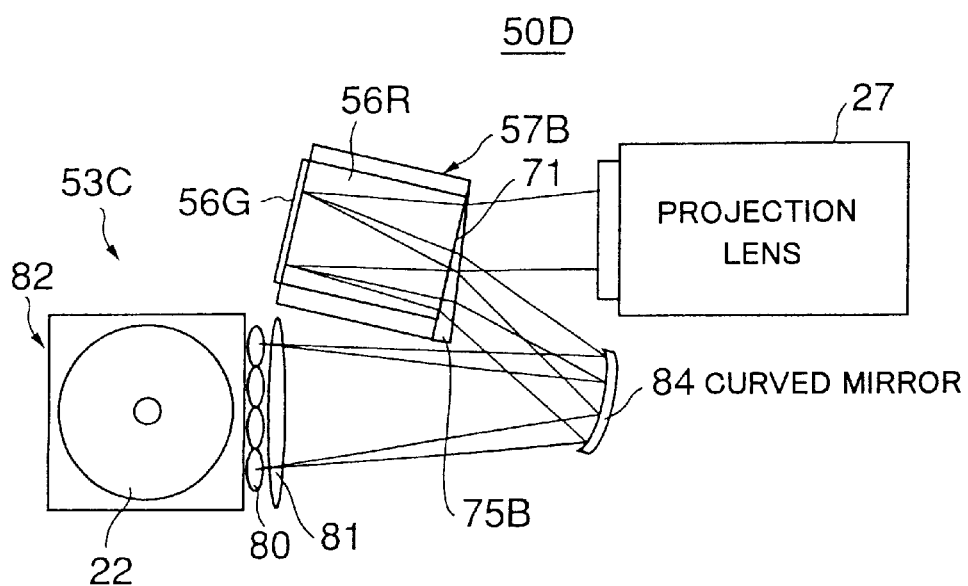
FIG. 29B is a schematic side elevational view of the reflective liquid crystal projector according to the tenth embodiment of the present invention.

The polarization controlling element 55B is provided in front of the third cylindrical lens array 80 as shown in FIG. 29A. The element 55B forms a light beam with desired wavelengths and emits the light beam with polarization vector plane (E) of a desired direction. The illumination light beam which is emitted from the polarization controlling element 55B enters into the overlap type dichroic cross prism 57B from the entering/exiting plane 71 by the reflective mirror 84.

The entered illumination light beam is separated into three colors (R, G, B) by the overlap type dichroic cross prism 57B, and each of color light beams exits from the corresponding surface toward each of the reflective display elements 56R, 56G and 56B. The light beams reflected by the reflective display elements 56R, 56G, and 56B are synthesized in the overlap type dichroic cross prism 57B into an image light beam, and the image light beam emits from the entering/exiting plane 71 toward the projector lens 27. The projector lens 27 projects the image formed by the reflective display elements 56R, 56G, and 56B while enlarging the image.

Figure 30A:
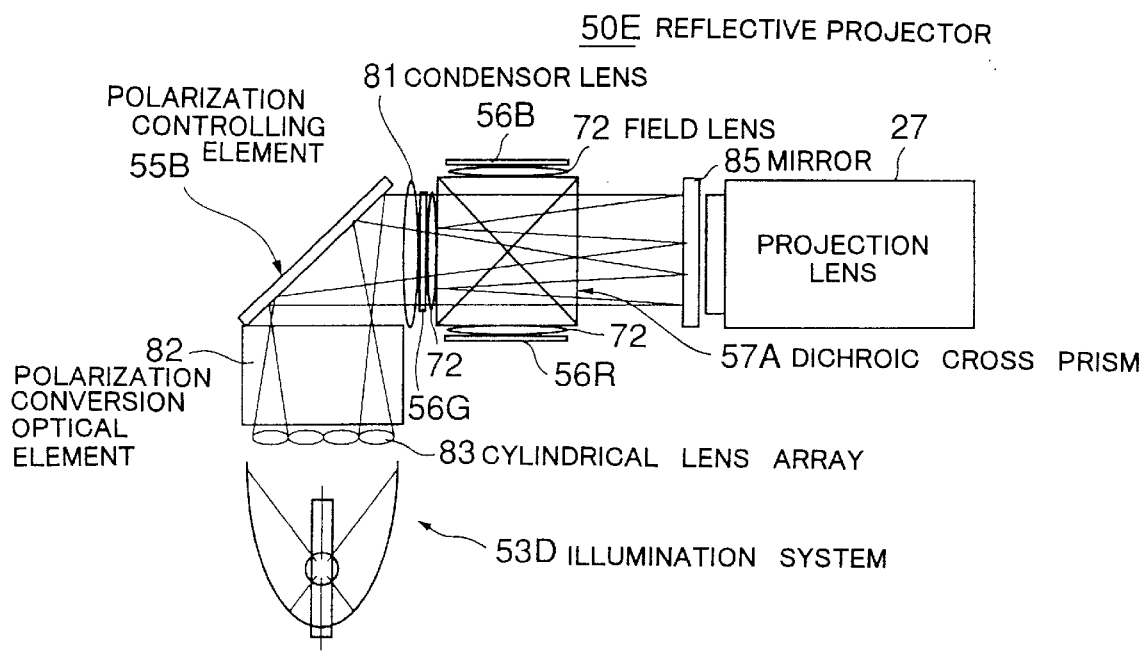
FIG. 30A is a schematic plan view of the reflective liquid crystal projector according to an eleventh embodiment of the present invention.
Figure 30B:
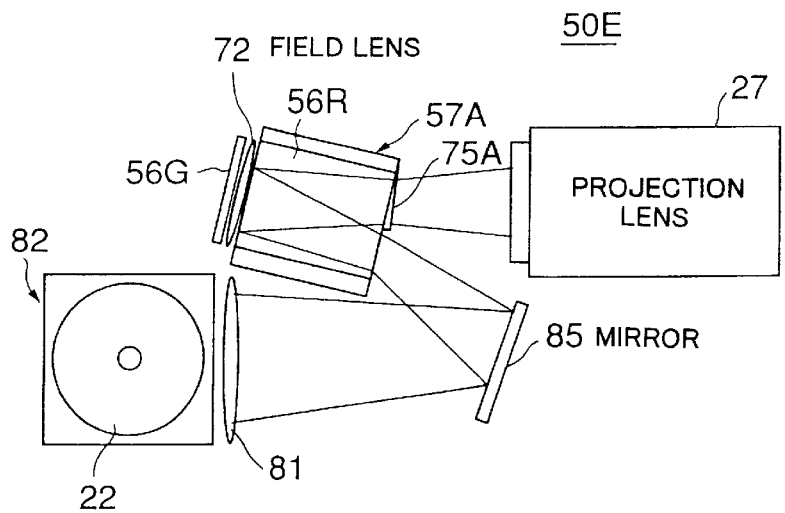
FIG. 30B is a schematic side elevational view of the reflective liquid crystal projector according to the eleventh embodiment of the present invention.

In the following, a reflective projector 50E of an eleventh embodiment will be described with reference to FIGS. 30A and 30B.

The reflective projector 50E of this embodiment includes the plate like polarization controlling element 55B shown in FIGS. 14A–14C as a polarization controlling element and the separate type dichroic cross prism 57A as a dichroic cross prism.

The illumination light beam which is emitted from the light source 21 is converted into a parallel light beam by the paraboloid reflector 22, and enters into the entering/exiting plane 71 of the separate type dichroic cross prism 57A through a cylindrical lens array 83, the polarization conversion optical element, the polarization controlling element 55B and the condenser lens 81. Then, the light beam impinges on each of the reflective display elements 56R, 56G, and 56B. The operation of the illumination system 53D is the same as that of the reflective projector 50D of the tenth embodiment shown in FIGS. 29A and 29B.

The illumination light beam impinging on the plane 71 is separated into three color light beams (R, G, B) by the separate type dichroic cross prism 57A, and each of color light beams exits from the corresponding surface toward each of the reflective display elements 56R, 56G and 56B. The light beams reflected by the reflective display elements 56R, 56G, and 56B are synthesized in the separate type dichroic cross prism 57A into an image light beam, and the image light beam emits from the entering/exiting plane 71 toward the projector lens 27. The projector lens 27 projects the image formed by the reflective display elements 56R, 56G, and 56B while enlarging the image.

Next, the polarization conversion optical element used in the above-mentioned embodiments will be described with reference to FIGS. 31–34.

Figure 31:
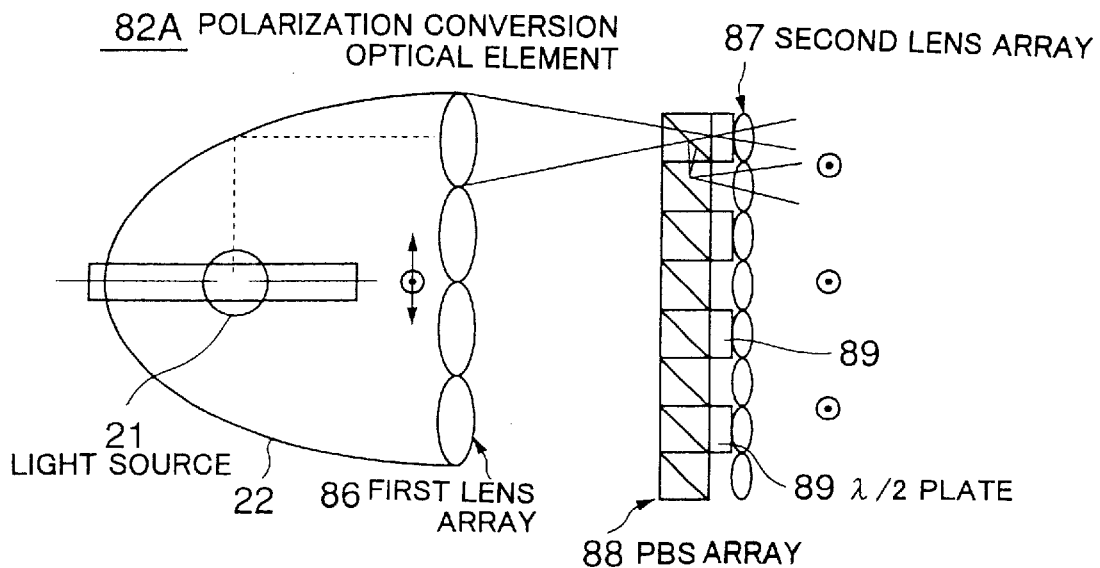
FIG. 31 is a diagram for explaining a first embodiment of a polarization conversion optical element.

The polarization conversion optical elements 82A and 82B shown in FIGS. 31 and 32 are conventionally used as polarization conversion optical elements. It is possible to apply the polarization conversion optical element 82A or 82B to the reflective projectors 50B–50E. The examples have been described with reference to FIGS. 41A, 41B and FIGS. 42A, 42B before.

The polarization conversion optical element 82A shown in FIG. 31 includes the first lens array 86, the second lens array 87 and the polarization separation prism array 88 (which will be called PBS array hereinafter), in which the PBS array 88 is provided between the first lens array 86 and the second lens array 87. The polarization conversion optical element 82B shown in FIG. 32 is a modification of the polarization conversion optical element 82A shown in FIG. 31 in which the order of the PBS array 88 and the second lens array 87 is changed.

In the polarization conversion optical element 82A, the pitch of the second lens array 87 needs to be half of the pitch of the first lens array 86, which results in difficulty of manufacturing. On the other hand, since the pitch of the second lens array 87 is equal to the pitch of the first lens array 86, the polarization conversion optical element 82B shown in FIG. 32 has an advantage on manufacturing.

As mentioned above, the two lens arrays 86 and 87 for polarization conversion are necessary for each of above-mentioned polarization conversion optical elements 82A and 82B.

Figure 33:
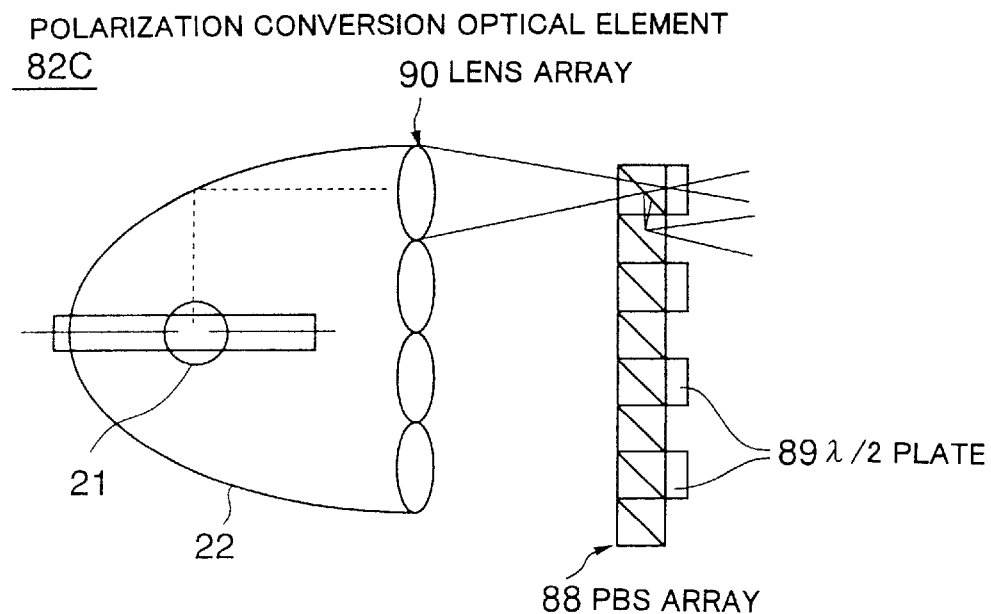
FIG. 33 is a diagram for explaining a third embodiment of the polarization conversion optical element.
Figure 34:
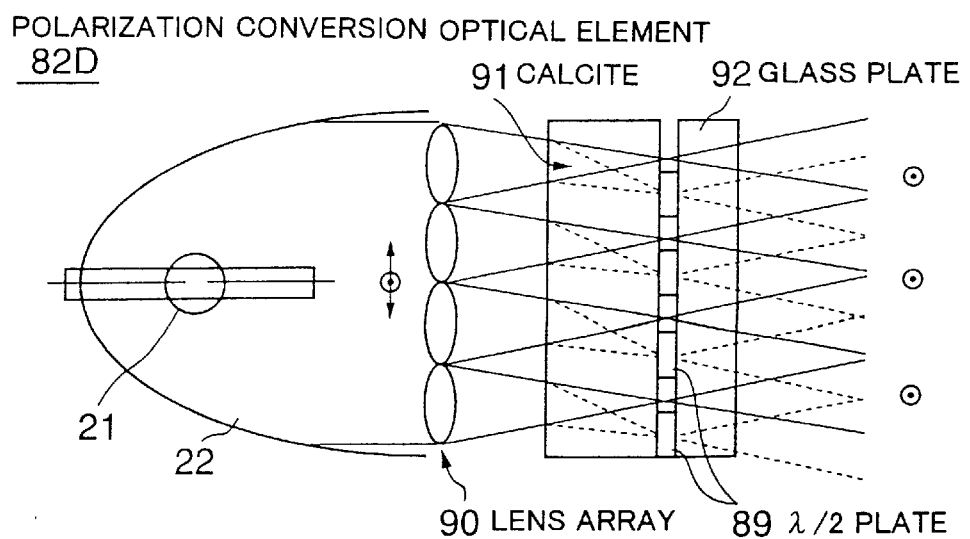
FIG. 34 is a diagram for explaining a fourth embodiment of the polarization conversion optical element.

On the other hand, polarization conversion optical elements 82C and 82D shown in FIGS. 33 and 34 do not have the second lens array 87. That is, in the polarization conversion optical elements 82C and 82D, the function of the second lens array 87 is realized by the polarization controlling element 55C with curved surfaces shown in FIGS. 28A and 28B or by a curved mirror 84 shown in FIGS. 29A and 29B.

The polarization conversion optical element 82C shown in FIG. 33 is an embodiment which uses the PBS array 88 as a polarization separation element. FIG. 34 shows an embodiment which uses the calcite 91 which is a uniaxial crystal as a polarization separation element. After one of polarized light beams separated by the PBS array 88 or the calcite 91 passes through the array like λ/2 plate 89, light beams with a polarization vector plane (E) of a desired direction can be generated.

In each figure, the direction of the arrow shows the oscillating direction of the electric field (E) of light. Further, it is needless to say that a polarizer can be provided for improving the degree of polarization of light in which polarization is converted. The λ/2 plate (λ/2 phase difference element) used by the present invention may not necessarily be limited to one phase difference plate. For example, the phase difference films and/or the phase difference plates in which they are formed like an array can be used.

Figure 35A:
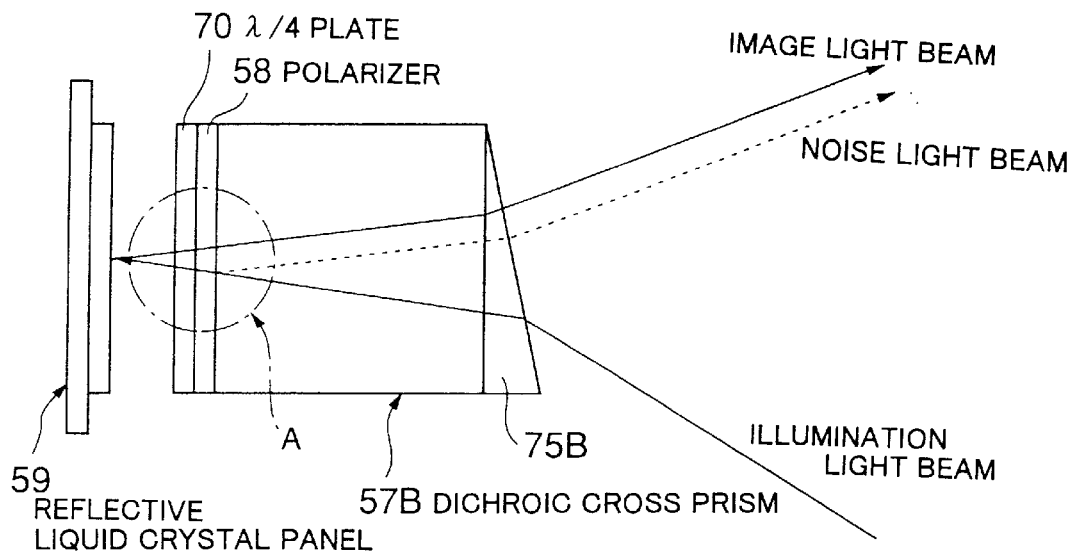
FIG. 35A is a diagram for explaining a reason for noise light.

By the way, in the reflective projector 50A–50E of the above-mentioned embodiments, as shown in FIG. 35A, the polarizer 58 and the dichroic cross prism (the overlap type dichroic cross prism 57B is shown as an example in FIG. 35A) are joined by an adhesive 93A, and the polarizer 58 and the λ/4 plate 70 are joined by an adhesive 93B in which the polarizer 58 and the λ/4 plate 70 function as an element for light intensity modulation.

Figure 35B:
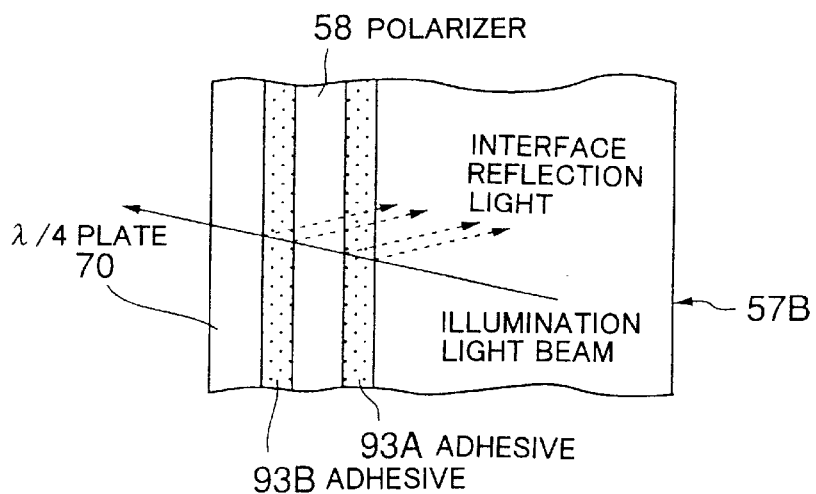
FIG. 35B is a diagram for explaining the reason for noise light showing an enlarged view of the inside of the circle indicated with an arrow A of FIG. 35A.

Therefore, as shown in FIG. 35B which shows an enlarged view of the inside of the circle indicated with the arrow A of FIG. 35A, interface reflection occurs in the junction interfaces, and the reflected light beam results in noise light in the optical system in the reflective type projector 50A–50E. Thus, if a light beam including the noise light is projected through the projection lens 27, the quality of the image will be degraded since the noise light overlaps with the projected image.

Figure 36:
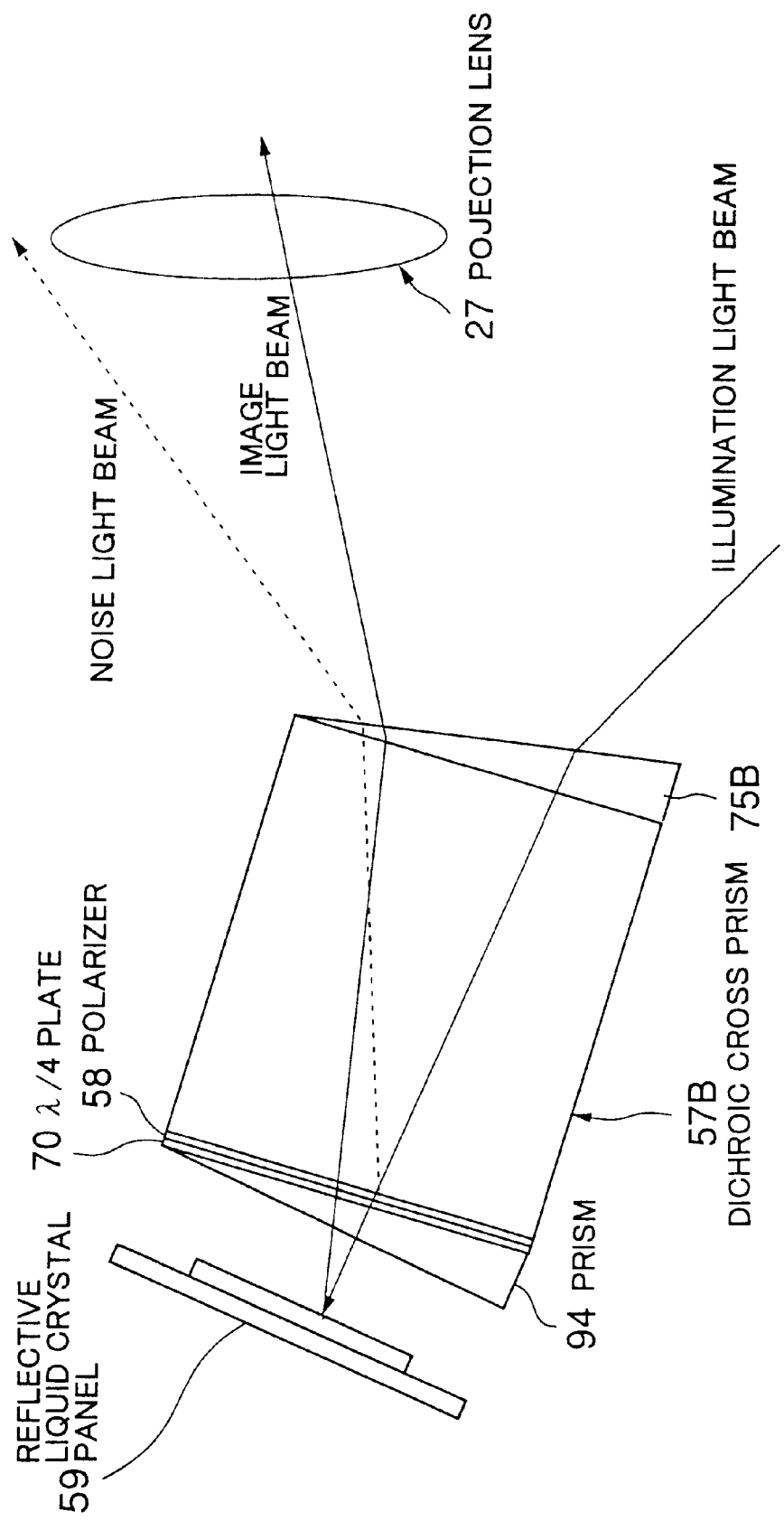
FIG. 36 is a block diagram of the dichroic cross prism of the reflective liquid crystal projector according to a twelfth embodiment of the present invention.
Figure 37:
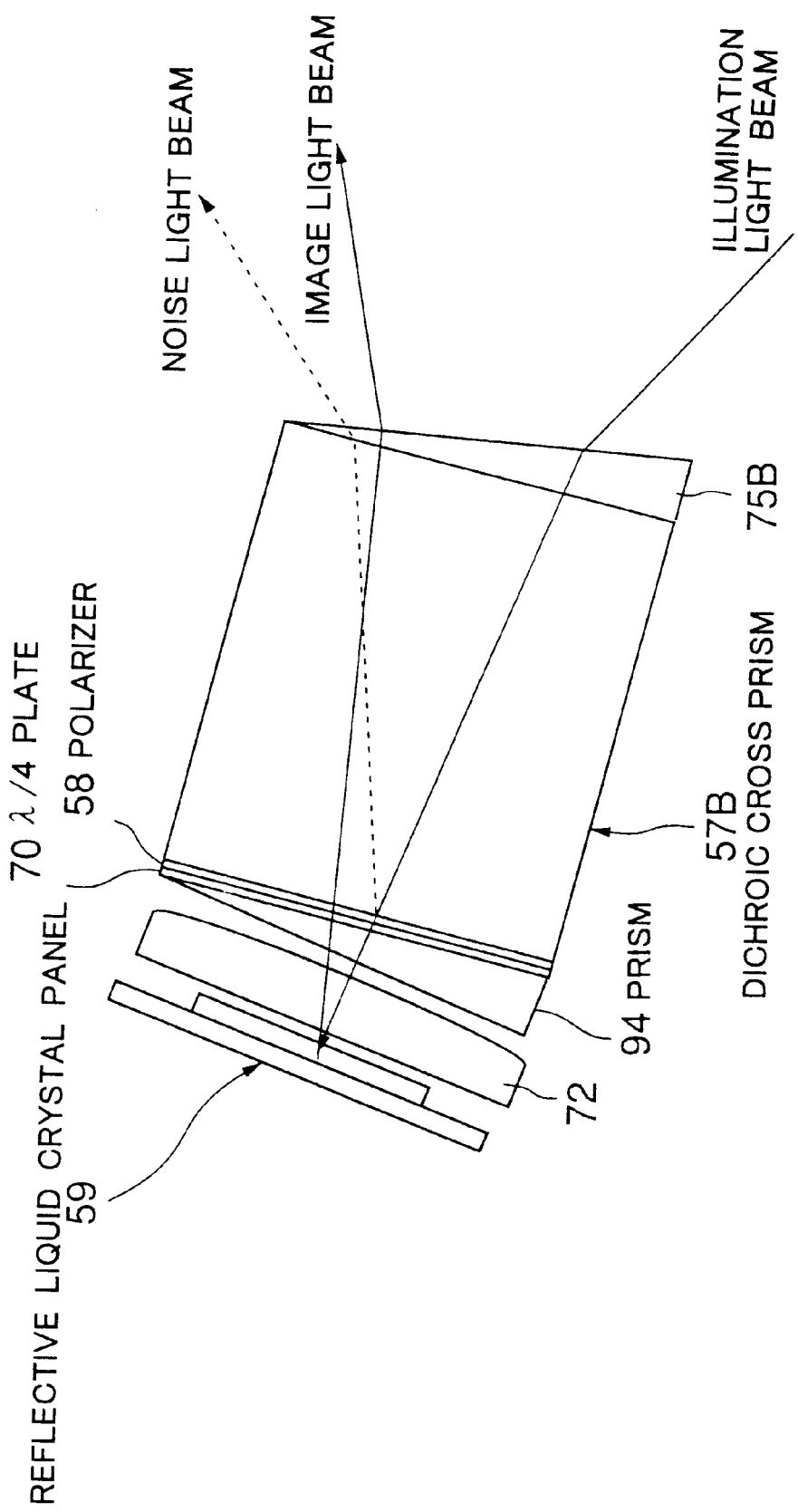
FIG. 37 is a block diagram of the dichroic cross prism of the reflective liquid crystal projector according to a first modification of the twelfth embodiment of the present invention.
Figure 38:
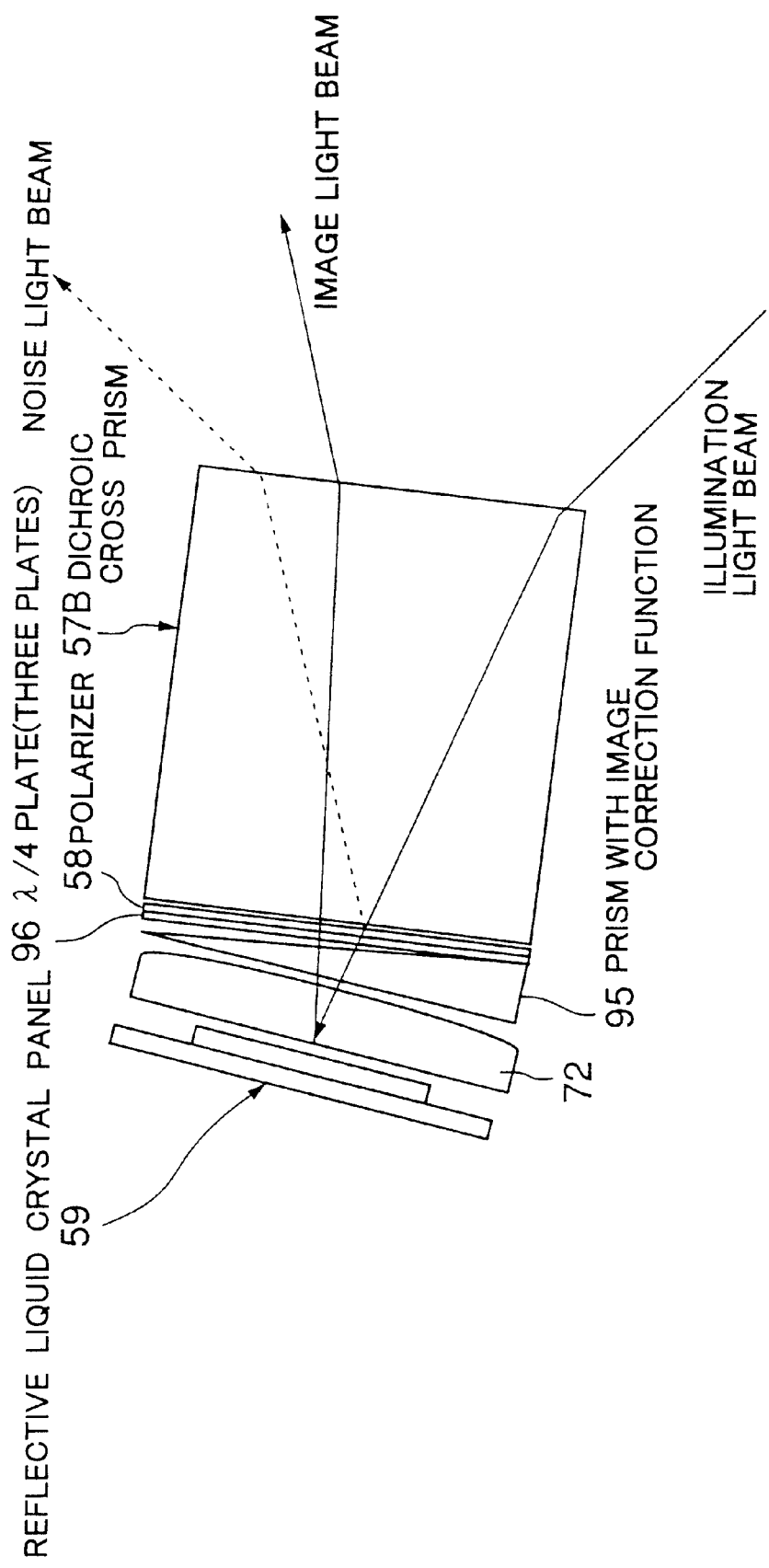
FIG. 38 is a block diagram of the dichroic cross prism of the reflective liquid crystal projector according to a second modification of the twelfth embodiment of the present invention.

FIGS. 36–38 are enlarged views of the dichroic cross prism of the reflective projector in which the quality degradation of the display image by this noise light is suppressed.

The reflective projector shown in FIG. 36 is configured such that the direction of the surface of the optical element such as the polarizer 58 and the λ/4 plate 70 which may generates noise light is different from the direction of the surface of the reflective liquid crystal panel 59. Specifically, a triangular prism 94 is provided on the λ/4 plate 70. Accordingly, the image light is emitted in a direction different from that of the noise light.

Thus, the noise light can be prevented from entering into the projection lens 27 since the directions of those are different. Therefore, the noise light will not overlaps with an image and the quality of the image can be improved. The method for differentiating the surface directions of the light intensity modulation element and the reflective type liquid crystal panel 59 is not limited to the method of using the prism 94. For example, other optical elements such as a wedge substrate can be used.

In a embodiment shown in FIG. 37, the prism 94 (or a wedge substrate) which has an inclined plane is provided between the field lens 72 and the dichroic cross prism 57B, and the polarizer 58 and the phase sheet (λ/4 plate 70) are provided on a surface which is not parallel with respect to the surface of the panel 59. Also in the configuration which has the field lens 72 like this embodiment, the noise light beam is emitted in a direction different from that of the image light beam.

In the configuration shown in FIG. 37, an image correction prism 75B and the noise elimination prism 94 are provided separately on dichroic cross prism 57B. On the other hand, in the embodiment shown in FIG. 38, a image correction prism 95 which has functions of the prism 75B and 94 is provided. Thereby, the configuration becomes simple. In this configuration shown in the FIG. 38, the reflective projector can be further made small.

By the way, in the configurations of the embodiments shown in FIGS. 37–38, since the polarizer 58 and the phase sheet (the λ/4 plate 70) are sandwiched between the dichroic cross prism 57B which consists of glass and the prism 94 or 95, emission of heat is difficult.

Figure 39:
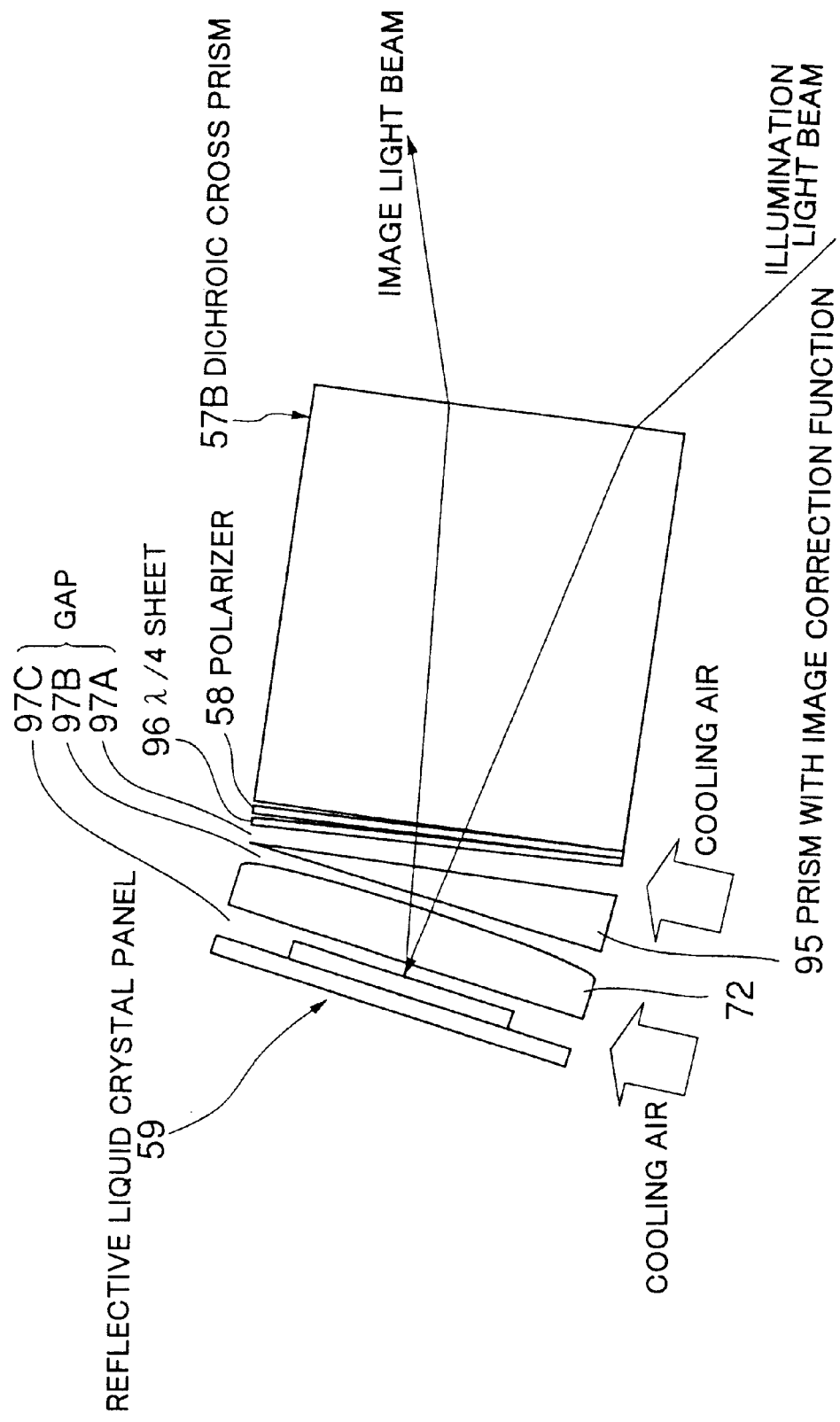
FIG. 39 is a block diagram of the dichroic cross prism of the reflective liquid crystal projector according to a thirteenth embodiment of the present invention.

Then, in the embodiments shown in FIGS. 39 and 40, a first gap 97A is formed between λ/4 plate 70 and the prism 95, a second gap 97B is formed between the prism 95 and the field lens 72, and a third gap 97C is formed between the field lens 72 and the reflective liquid crystal panel 59. Further, a air blowing unit for blowing cool air forcefully toward each of the gaps 97A–97C is provided.

According to this embodiment, the reflective liquid crystal panel 59, the field lens 72, the polarizer 58, and the phase sheet (λ/4 plate 70) can be cooled efficiently. As a result, the reflective projector can be more reliable. The projector can also deal with a powerful incident light (irradiation light) by having a pre-polarizer 98 between the polarizer 58 and the dichroic cross prism 57B as shown in FIG. 40.

In the above-mentioned embodiments, the dichroic cross prisms 57, 57A, and 57B which function as color separation/synthesis parts perform the color separation/synthesis so that reflection characteristics varies according to polarization, and the prisms are configured such that the polarization of the reflected light beams is different from that of the transmitted light beams. Further, the polarization controlling elements 55A–55D with which only polarization of predetermined wavelengths' light is differentiated are provided in the illumination systems 53, 53A–53D.

However, the color separation/synthesis part (which is the dichroic cross prism) does not necessarily need to perform the color separation/synthesis such that reflection characteristics vary according to polarization. For example, a dichroic cross prism which is configured such that polarization of the reflected light beam and polarization of the transmitted light beam become the same can be used as the color separation/synthesis part, and, a wavelength selection element which generates light of predetermined wavelengths can be provided in the illumination system.

When the color separation/synthesis part which is configured such that polarization of the reflected light beam and polarization of the transmitted light beam become the same is used, the brightness of an image may decrease compared with the reflective projector 50A–50E of the above-mentioned embodiments. However, miniaturization can be realized when being compared with the conventional projector 10 (FIG. 1) as is evident from above descriptions.

Further, it is possible to use polarization-controlling element 55B shown in FIGS. 14A–14C which includes the first and second selected wavelength reflection layers which reflect predetermined wavelength' light as a wavelength selection element. And, it is also possible to use the polarization-controlling element 55C shown in FIG. 15 in which the surface on which the selected wavelength reflection layer is formed is flat or curved.

According to the present invention, various effects described below will be obtained.

Since an expensive polarization beam splitter becomes unnecessary, a good contrast image can be obtained at low cost.

Further, according to the present invention, degradation of color purity and efficiency which occurs when a high-efficiency reflective liquid crystal panel is used can be improved by a simple modification. Therefore, the performance of the reflective projector can be enhanced.

Further, the reflective projector with high performance and high efficiency can be realized while maintaining it at small sized and low cost.

Furthermore, according to the present invention, since the exiting direction of the image light beam is differentiated from that of the noise light beam, display quality and resolution can be enhanced.

The present invention is not limited to the specifically disclosed embodiments, and variations and modifications may be made without departing from the scope of the invention.

What is claimed is:

1. A reflective projector comprising:
   an illumination system for generating an illumination light beam with predetermined wavelengths;
   a plurality of reflective display elements for generating image light beams by reflecting said illumination light beam emitted from said illumination system;
   a polarization controlling element for changing polarization of a predetermined wavelength of light emitted from said illumination system;
   a color separation/synthesis unit for separating said illumination light beam into light beams of predetermined colors and for synthesizing said image light beams from said reflective display elements;
   a projection lens for projecting said synthesized image light beams;
   wherein said reflective projector is formed such that said illumination light beam impinges on a light entering/exiting surface which is one of a plurality of surfaces of said color separation/synthesis unit and said image light beam exits from said light entering/exiting surface toward said projection lens; and
   wherein said illumination light beam and said image light beam are separated by controlling an entry angle of said illumination light beam or an exiting angle of said image light beam with respect to said color separation/synthesis unit, or by controlling an entry angle of said illumination light beam or an exiting angle of said image light beam with respect to each of said reflective display elements.

2. The reflective projector as claimed in claim 1, wherein said illumination light beam impinges on said color separation/synthesis unit such that the optical axis of said illumination light beam is parallel to a plane which is parallel to a color separation direction defined by said color separation synthesis unit.

3. The reflective projector as claimed in claim 1, wherein said illumination light beam impinges on said color separation/synthesis unit such that the optical axis of said illumination light beam intersects a plane which is parallel to a color separation direction defined by said color separation/synthesis unit.

4. The reflective projector as claimed in claim 3, wherein the area on which said illumination light beam impinges is separat ed from the area from which said image light beam exits in said light entering/exiting surface, the optical system from said illumination system to said projection lens being formed to be an anamorphic system.

5. The reflective projector as claimed in claim 3, wherein the area on which said illumination light beam impinges is separated from the area from which said image light beam exits in said light entering/exiting surface, the optical system from said illumination system to said projection lens being formed to be axially symmetric with respect to the optical axis of the optical system.

6. The reflective projector as claimed in claim 3, wherein the area on which said illumination light beam impinges overlaps with the area from which said image light beam exits in said light entering/exiting surface, the optical system from said illumination system to said projection lens being formed to be an anamorphic system.

7. The reflective projector as claimed in claim 3, wherein the area on which said illumination light beam impinges overlaps with the area from which said image light beam exits in said light entering/exiting surface, the optical system from said illumination system to said projection lens being formed to be axially symmetric with respect to the optical axis of the optical system.

8. The reflective projector as claimed in claim 3, wherein said color separation/synthesis unit includes a dichroic cross prism which has reflection characteristics depending on polarization for color separation and is formed such that reflected polarized light and transmitted polarized light are different in polarization.

9. The reflective projector as claimed in claim 8, wherein said polarization controlling element has wavelength selection characteristics for filtering light of predetermined wavelengths.

10. The reflective projector as claimed in claim 9, wherein said polarization controlling element generates light of wavelengths for green which light has a polarization vector plane parallel to the color separation direction of said dichroic cross prism, and said polarization controlling element generates light of wavelengths for red and blue which light has a polarization vector plane perpendicular to the color separation direction of said dichroic cross prism.

11. The reflective projector as claimed in claim 9, wherein said polarization controlling element comprises:
   a first element having a selected wavelength reflection layer for reflecting light of predetermined wavelengths;
   a second element having a selected wavelength reflection layer for reflecting light of predetermined wavelengths; and
   a circular polarization generating element provided between said first element and said second element.

12. The reflective projector as claimed in claim 11, wherein said circular polarization generating element comprises a plurality of $\lambda/4$ sheets.

13. The reflective projector as claimed in claim 11, wherein the surface on which said selected wavelength reflection layer is formed is flat or curved.

14. The reflective projector as claimed in claim 3, further comprising a wavelength selection element, provided in said illumination system, for generating light of predetermined wavelengths, wherein said color separation/synthesis unit includes a dichroic cross prism which is formed such that reflected polarized light and transmitted polarized light have the same polarization.

15. The reflective projector as claimed in claim 14, wherein said wavelength selection element comprises:
   a first element having a selected wavelength reflection layer for reflecting light of predetermined wavelengths; and
   a second element having a selected wavelength reflection layer for reflecting light of predetermined wavelengths.

16. The reflective projector as claimed in claim 15, wherein the surface on which said selected wavelength reflection layer is formed is flat or curved.

17. The reflective projector as claimed in claim 8, further comprising a prism or a wedge substrate, provided on a light entering/exiting surface of said dichroic cross prism, for suppressing aberration.

18. The reflective projector as claimed in claim 3, wherein said reflective display element comprises a time sharing display element.

19. The reflective projector as claimed in claim 18, wherein said time sharing display element is a micro-mirror device.

20. The reflective projector as claimed in claim 3, wherein said reflective display element comprises:
   a phase modulation element for modulating phase of impinged light by reflection; and
   a light intensity modulation element for modulating light intensity.

21. The reflective projector as claimed in claim 20, wherein said phase modulation element comprises a liquid crystal panel having a $\lambda/4$ modulation amount and said light intensity modulation element comprises a polarizer.

22. The reflective projector as claimed in claim 20, wherein said phase modulation element comprises a liquid crystal panel for changing a direction of polarization by 90° and said light intensity modulation element comprises a polarizer and a circular polarization generating element.

23. The reflective projector as claimed in claim 20, wherein the reflection surface of said reflective display element and said light intensity modulation element are in absolute contact with one another in parallel.

24. The reflective projector as claimed in claim 20, wherein the reflection surface of said reflective display element and said light intensity modulation element are separated.

25. The reflective projector as claimed in claim 20, wherein the reflection surface of said reflective display element and said light intensity modulation element form an angle with respect to the light entry angle to said reflection surface.

26. The reflective projector as claimed in claim 25, wherein a prism or a wedge substrate is provided on a surface of said color separation/synthesis unit which surface faces said reflective display element, and said light intensity modulation element is provided between said prism and said color separation/synthesis unit or between said wedge substrate and said color separation/synthesis unit.

27. The reflective projector as claimed in claim 25, wherein said light intensity modulation element is bonded to said color separation/synthesis unit.

28. The reflective projector as claimed in claim 26, wherein a gap is formed between said prism and said color separation/synthesis unit or between said wedge substrate and said color separation/synthesis unit.

29. The reflective projector as claimed in claim 3, wherein said illumination system comprises:

a polarization conversion optical system for converting polarization of a light beam emitted from said light source into a predetermined polarization; and an integrated optical system which allows a light beam from said polarization conversion optical system to enter said color separation/synthesis unit in a slanting direction.

30. The reflective projector as claimed in claim 29, wherein said polarization conversion optical system comprises:

a lens array;

a polarization separation element for shifting light gathered by said lens array in one direction; and a λ/2 sheet array arranged in the same direction as the direction in which said polarization separation element spreads.

31. The reflective projector as claimed in claim 29, wherein said integrated optical system comprises:

a first lens array for converging a light beam emitted from said light source;

a second lens array for forming an image of the aperture of said first lens array in which the image has the same size as that of said reflective display element; and a condenser lens for gathering a light beam which passes through said second lens array on said reflective display element.

32. The reflective projector as claimed in claim 3, further comprising a field lens between said reflective display element and said color separation/synthesis unit.

33. The reflective projector as claimed in claim 3, further comprising a cooling unit for cooling at least one of said reflective display element and said light intensity modulation element.

* * * * *

UNITED STATES PATENT AND TRADEMARK OFFICE
CERTIFICATE OF CORRECTION

PATENT NO. : 6,478,429 B1
DATED : November 12, 2002
INVENTOR(S) : Aritake et al.

It is certified that error appears in the above-identified patent and that said Letters Patent is hereby corrected as shown below:

Column 27,
Line 7, delete "separat ed" insert -- separated --.

Signed and Sealed this

Twenty-fifth Day of March, 2003

JAMES E. ROGAN
*Director of the United States Patent and Trademark Office*